United States Patent
Park et al.

(10) Patent No.: US 7,179,398 B2
(45) Date of Patent: Feb. 20, 2007

(54) ETCHANT FOR WIRES, A METHOD FOR MANUFACTURING THE WIRES USING THE ETCHANT, A THIN FILM TRANSISTOR ARRAY SUBSTRATE AND A METHOD FOR MANUFACTURING THE SAME INCLUDING THE METHOD

(75) Inventors: Hong-Scik Park, Yongin (KR); Sung-Chul Kang, Seongnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 363 days.

(21) Appl. No.: 10/451,590

(22) PCT Filed: Jan. 24, 2002

(86) PCT No.: PCT/KR02/00112

§ 371 (c)(1),
(2), (4) Date: Jun. 23, 2003

(87) PCT Pub. No.: WO03/036377

PCT Pub. Date: May 1, 2003

(65) Prior Publication Data

US 2004/0055997 A1    Mar. 25, 2004

(30) Foreign Application Priority Data

Oct. 23, 2001    (KR) ............................... 2001-65326

(51) Int. Cl.
*C09K 13/00* (2006.01)
*C09K 13/04* (2006.01)
*C09K 13/06* (2006.01)
*H01L 21/302* (2006.01)

(52) U.S. Cl. ................... 252/79.1; 252/79.2; 252/79.4; 438/745

(58) Field of Classification Search ............... 252/79.1, 252/79.2, 79.4; 438/745
See application file for complete search history.

(56) References Cited

U.S. PATENT DOCUMENTS

| | | | |
|---|---|---|---|
| 3,691,627 A * | 9/1972 | Engeler .................... | 438/301 |
| 4,329,210 A | 5/1982 | Merchant et al. .......... | 204/107 |
| 4,663,107 A * | 5/1987 | Takada et al. ............. | 264/519 |
| 4,874,462 A | 10/1989 | Makita et al. ............. | 156/635 |
| 5,153,754 A * | 10/1992 | Whetten .................... | 349/147 |
| 5,174,872 A * | 12/1992 | Scott ........................ | 205/779 |
| 6,265,309 B1 * | 7/2001 | Gotoh et al. ............... | 438/637 |
| 6,429,095 B1 * | 8/2002 | Sakaguchi et al. ......... | 438/458 |
| 6,514,357 B1 * | 2/2003 | Tada et al. ................. | 148/251 |
| 6,797,621 B2 * | 9/2004 | Song et al. ................. | 438/689 |
| 2003/0010280 A1 * | 1/2003 | Sugihara et al. ............ | 117/97 |

OTHER PUBLICATIONS

Korean 2001-75932, Aug. 11, 2001.

* cited by examiner

*Primary Examiner*—Nadine Norton
*Assistant Examiner*—Lynette T. Umez-Eronini
(74) *Attorney, Agent, or Firm*—F. Chau & Associates, LLC

(57) ABSTRACT

First, a lower film of AlNd Alloy and an upper film of MoW alloy are deposited in succession, and then patterned by an etchant including $HNO_3$ of 0.1–10%, $H_3PO_4$ of 65–55%, $CH_3COOH$ of 5–20%, a stabilizer of 0.1–5% and the other ultra pure eater, to form a gate wire including a gate line, a gate electrode and a gate pad on a substrate. Next, a gate insulating film, a semiconductor layer and an ohmic contact layer are formed in succession, and then, MoW alloy is deposited and patterned by an etchant including $HNO_3$ of 0.1–10%, $H_3PO_4$ of 65–55%, $CH_3COOH$ of 5–20%, a stabilizer of 0.1–5% and the other ultra pure water, to form a data wire including a data line intersecting the gate line, a source electrode, a drain electrode and a data pad. Next, a passivation layer is deposited and patterned to form contact holes for exposing the drain electrode, the gate pad and the data pad, respectively. Then, IZO is deposited and patterned to form a pixel electrode, an auxiliary gate pad and an auxiliary data pad electrically connected to the drain electrode, the gate pad and data pad, respectively.

8 Claims, 30 Drawing Sheets

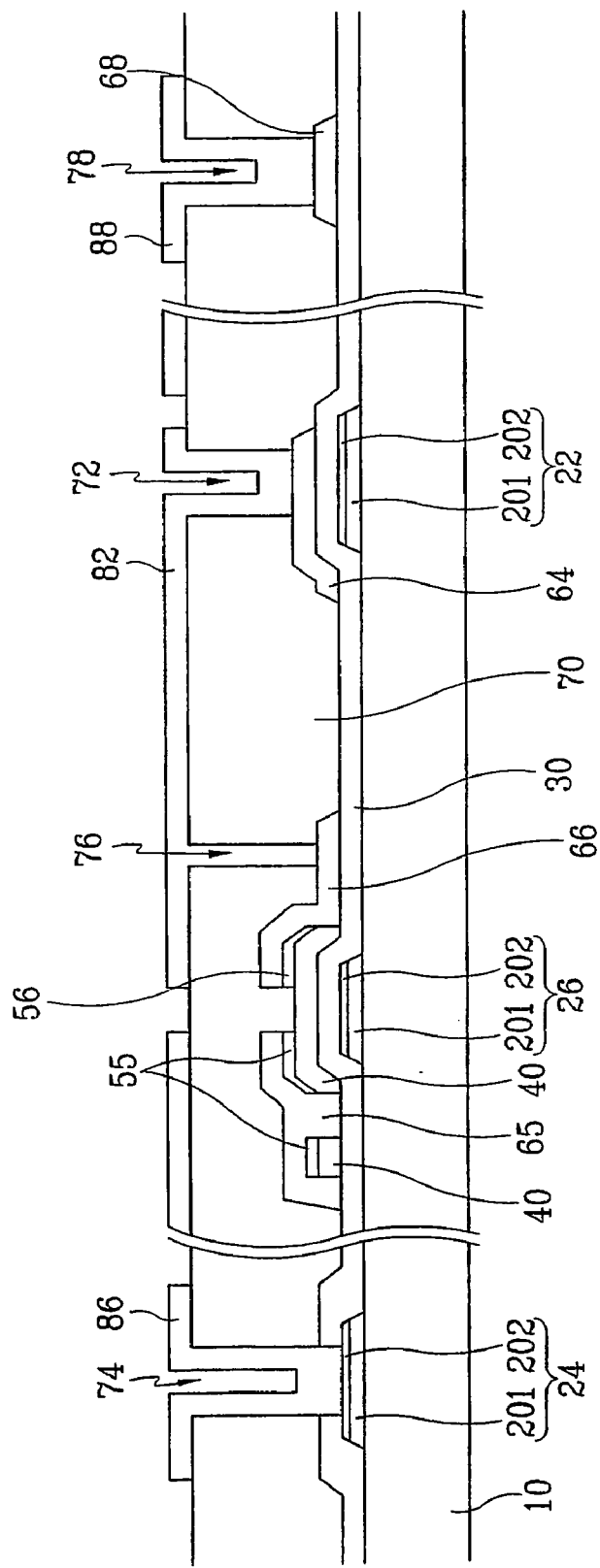

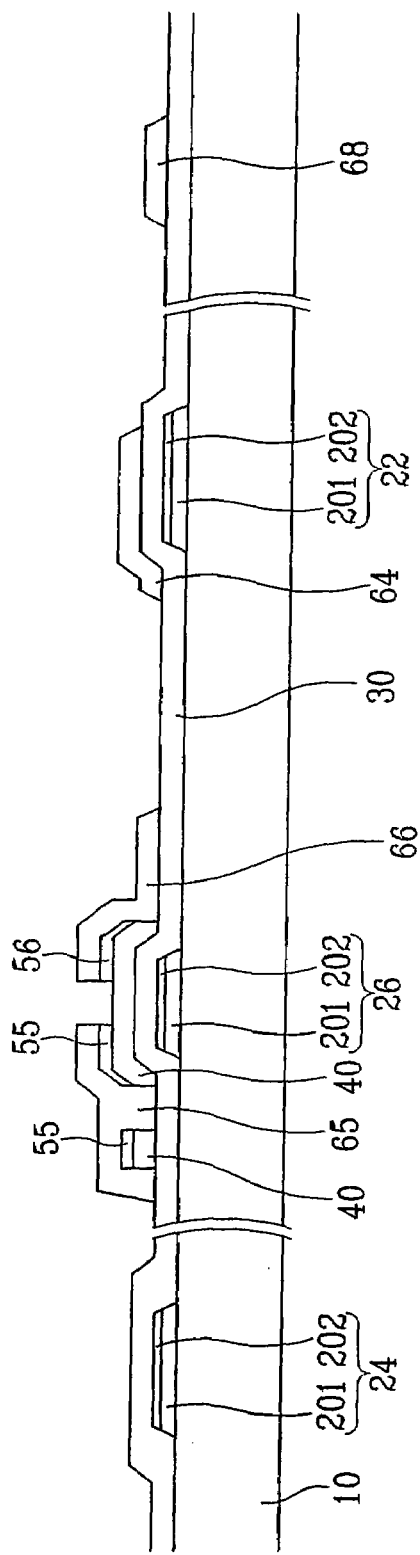

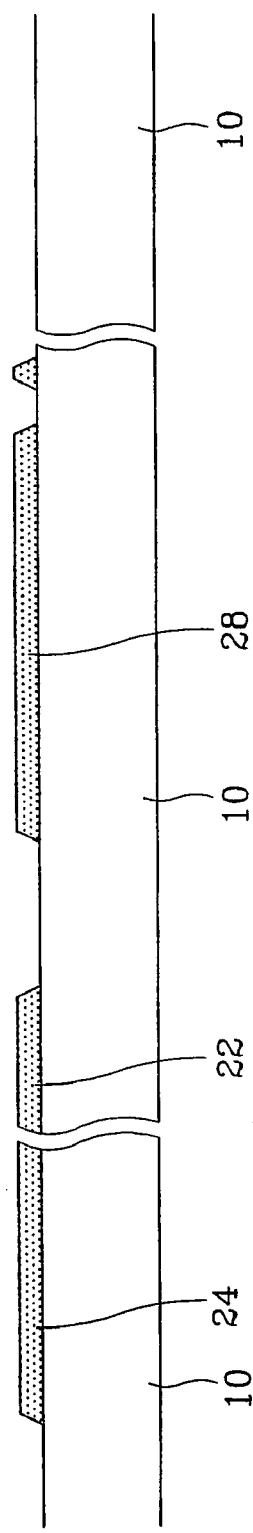

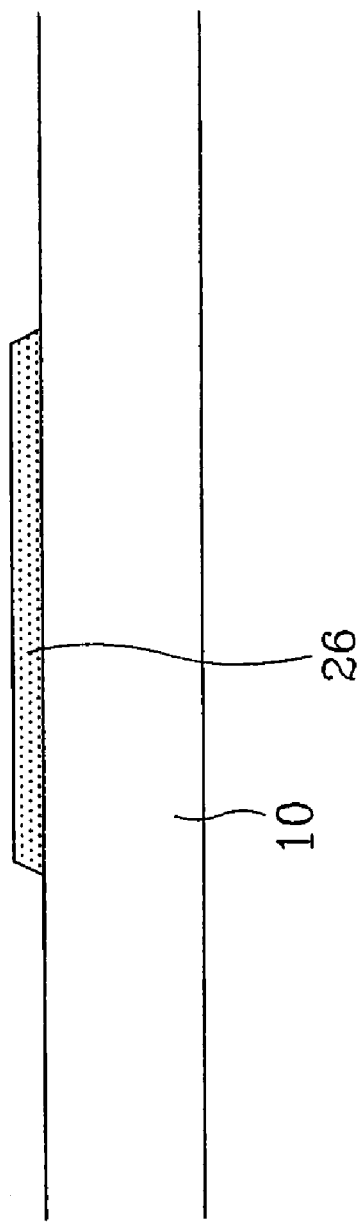

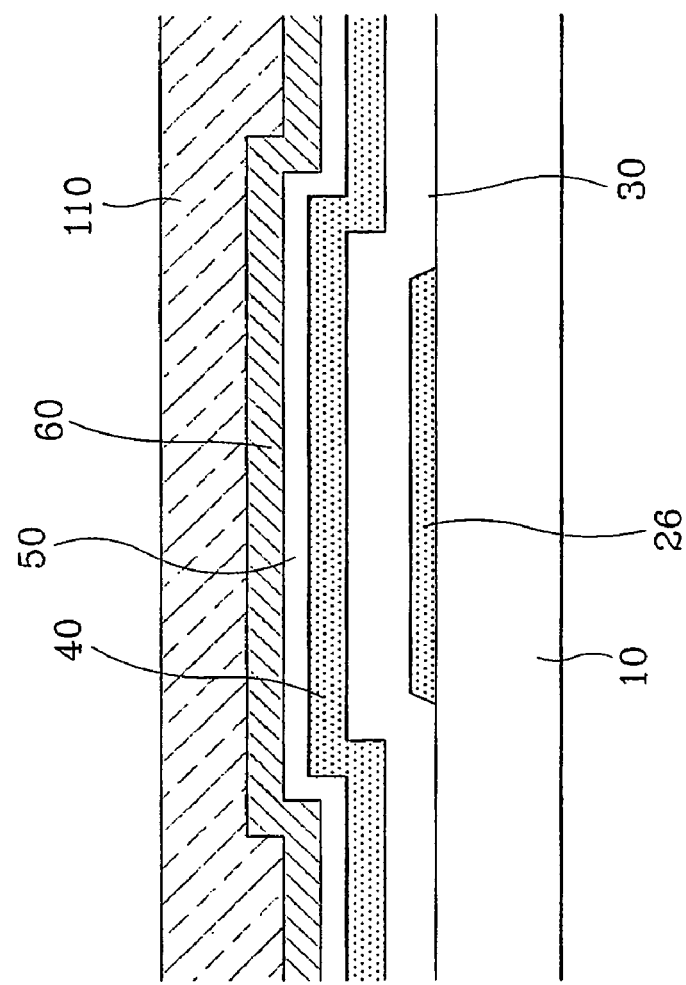

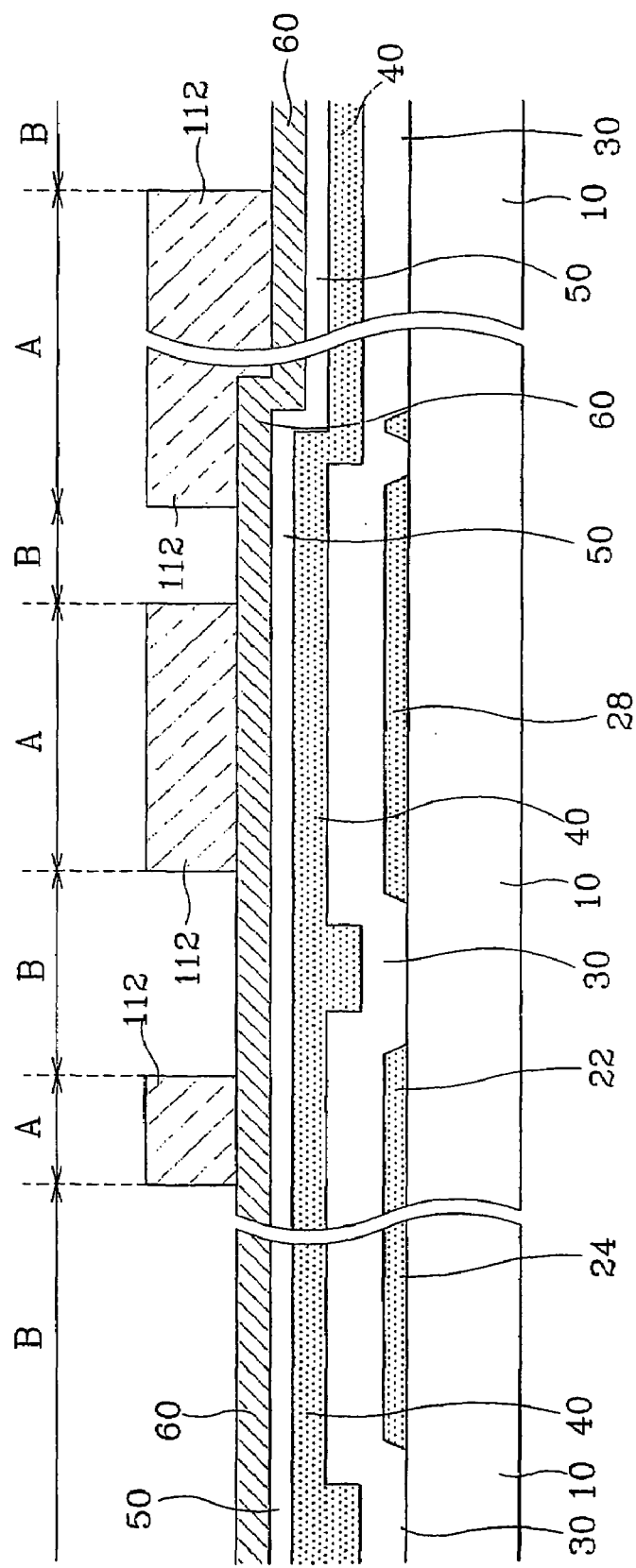

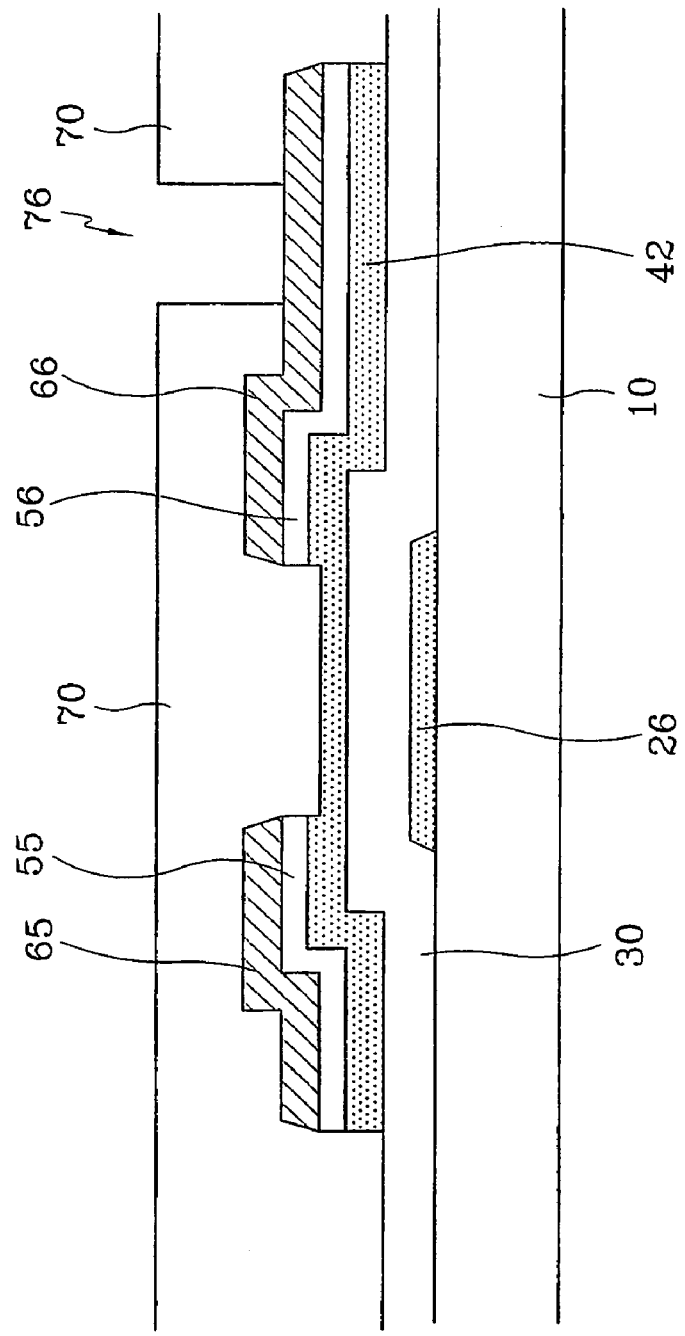

ETCHANT FOR WIRES, A METHOD FOR MANUFACTURING THE WIRES USING THE ETCHANT, A THIN FILM TRANSISTOR ARRAY SUBSTRATE AND A METHOD FOR MANUFACTURING THE SAME INCLUDING THE METHOD

BACKGROUND OF THE INVENTION (a) Field of the Invention

The present invention relates to etchant for wire, a method of manufacturing wire by using the etchant, a thin film transistor array panel, and the manufacturing method thereof using the same.

(b) Description of the Related Art

Generally, a wire of a semiconductor device is used as a device for transferring signals, thereby required to minimize signal delay.

In this case, for prevent the signal delay, the wire are formed of metal material having low resistance, especially metal material of aluminum system such as aluminum (Al) or aluminum alloy (Al alloy). However, since the wire of the aluminum system is weak for physical and chemical characteristics, the wire are eroded in a contact portion being in contact with another conductive material, and this causes degradation of the characteristics of the device. In particular, when the aluminum is reinforced by ITO (indium tin oxide) or IZO (indium zinc oxide) as material for pixel electrodes in pad portion of an liquid crystal display, the contact feature of the Al or the Al alloy and the ITO or the IZO is deteriorated and generally a substrate where thin film transistors are formed is manufactured by a photo etching process using masks. Here, it is preferable to decrease the number of masks in order to reduce production cost.

SUMMARY OF THE INVENTION

It is an object of the present invention to provide etchant for wire of Mo or Mo alloy formed of a low resistant material and having low resistant contact feature with another material to pattern the wire in order to have a good taper structure and evenness.

It is another object of the present invention to provide a manufacturing method of a thin film transistor array panel of a taper structure with a good contact feature and infirmity, and a low slop angle as well as low resistance.

It is the other object of the present invention to simplify a method of manufacturing a thin film transistor panel.

To solve these problems, in the present invention, an etchant for wire for pattering a wire of Mo or Mo alloy includes HNO3, H3PO4, CH3COOH, a stabilizer and the other ultra pure water. In this case, the etchant includes $HNO_3$ of 0.1 to 10%, $H_3PO_4$ of 65 to 55%, $CH_3COOH$ of 5 to 20%, stabilizer of 0.1 to 5% and the other ultra pure water, preferably, the stabilizer is a compound being represented as formula 1.

$$M(OH)x.Ly \qquad (1)$$

wherein, M is Zn, Sn, Cr, Al, Ba, Fe, Ti, Si, or B, L is $H_2O$, $NH_3$, CN, COR (herein, R is alkyl having the number of carbon of 1 to 5), $NH_2R$ (herein, R is alkyl having the number of carbon of 1 to 5), or NNR (herein, R is alkyl having the number of carbon of 1 to 5), x is 2 or 3, and y is 0, 1, 2, or 3.

In this case, the etchant is preferably used to etch MoW alloy.

The etchant for wire and the method of manufacturing the wire is also applicable to a thin film transistor array panel and the manufacturing method thereof.

A method of manufacturing a thin film transistor array panel comprising: forming a gate wire including a gate line and a gate electrode; forming a gate insulating layer covering the gate wire; forming a semiconductor layer on the gate insulating layer of the gate electrode; and forming a data wire including a source electrode, a drain electrode and a data line on the semiconductor layer or the gate insulating layer. Here, the gate wire or the data wire is formed with a first conductive film made of Mo or Mo alloy, wherein the first conductive film is patterned using $HNO_3$ of 0.1 to 10%, $H_3PO_4$ of 65 to 55%, $CH_3COOH$ of 5 to 20%, stabilizer of 0.1 to 5% and the other ultra pure water. The gate wire may include a second conductive film of Al or Al alloy on the lower side of the first conductive film and the second conductive film together with the first conductive film may be patterned.

A passivation layer having a first contact hole for exposing the drain electrode between the data wire and the pixel electrode connected to the data wire and made of IZO may be further formed. Here, the passivation layer may be formed of SiNx, SiOC, SiOF, an organic insulating material.

The gate wire further comprises a gate pad connected to the gate line, and the data wire further comprises a data pad connected to the data pad. In the step of forming a pixel electrode, an auxiliary gate pad and an auxiliary data pad each connected to the gate pad and the data pad via a second contact hole and a third contact hole of the passivation layer may be further formed.

The data wire and the semiconductor layer may be formed altogether by a photo etching process using a photosensitive film pattern having a partly different thickness. The photosensitive film pattern includes a first portion having a first thickness, a second portion is thicker than the first portion and a third portion is excluded from the first portion and the second portion.

In the photo etching process, it is preferable that the first portion is located between the source electrode and the drain electrode, and the is second portion is located on the data wire.

A thin film transistor array panel using such manufacturing method has a first conductive film made of Mo or Mo alloy and a pixel electrode, and its IZO films of an auxiliary gate pad and an auxiliary data pad are in contact with each other.

BRIEF DESCRIPTION OF THE DRAWINGS

FIG. 3 is a cross sectional view taken along line III–III' of the thin film transistor shown in FIG. 2.

FIG. 4b is a cross sectional view taken along line IVb–IVb' shown in FIG. 4a.

FIG. 6b is a cross sectional view taken along line VIb-–VIb' shown in FIG. 6a, and shows the next step of FIG. 5b.

FIGS. 11b and 11c are cross sectional views taken along line XIb–XIb' and XIc–XIc' shown in FIG. 11a, respectively.

FIGS. 12a and 12b are cross sectional views taken along line XIb–XIb' and XIc–XIc' shown in FIG. 11a, respectively, and shows show the next steps of FIG. 11b and FIG. 11c.

FIGS. 13b and 13c are cross sectional views taken along line XIIIb–XIIIb' and XIIIc–XIIIc' shown in FIG. 13a, respectively.

FIGS. 17b and 17c are cross sectional views taken along line XVIIb–XVIIb' and XVIIc–XVIIc', respectively.

DETAILED DESCRIPTION OF THE PREFERRED EMBODIMENTS

An etchant for wire, a method of manufacturing using the same, a thin film transistor array panel including the same and the manufacturing method thereof will be explained in detail for the those skilled in the are to practice easily with reference to the accompanying drawings.

Al, Al alloy, Mo, Mo alloy, and Cu, etc. are suitable for wire of a semiconductor device, especially a display device. In the meantime, the wire must have pad for receiving signals from an external device or supplying signals to an external device. Materials for the pad must have resistivity less than predetermined level, be hard to be oxidized, be hard to be disconnected in the manufacturing process, and have a low contact resistance when in contact with another materials. Thus, Mo or Mo alloy having these characteristics is preferable to form the wire. Moreover, a conductive film of Al or Al alloy, which has the resistivity lower than the Mo or the Mo alloy when forming the wire of multi-layers, may be further formed.

When Mo or Mo alloy is deposited and patterned to form the wire, an etchant for etching process, especially wet etching process has to pattern Mo or Mo alloy to form the taper structure having a low slope angle in the range of 20 to 70 degrees below, and, even when forming the wire of double structure, an etching thereof is performed simultaneously by using one etchant but has to be capable of making them in the form of taper having a low slope angle. Furthermore, it is preferable that the evenness of the overall substrate is stable in the range of less than 5%.

In this process, the etchant including $HNO_3$ of 0.1 to 10%, $H_3PO_4$ of 65 to 55%, $CH_3COOH$ of 5 to 20%, a stabilizer of 0.1 to 5% and the other ultra pure water is used for wire of the Mo or the Mo alloy.

Preferably, the stabilizer is a compound being represented as formula 1

$$M(OH)x.Ly \quad (1)$$

wherein, M is Zn, Sn, Cr, Al, Ba, Fe, Ti, Si, or B, L is $H_2O$, $NH_3$, CN, COR (herein, R is alkyl having the number of carbon of 1 to 5), $NH_2R$ (herein, R is alkyl having the number of carbon of 1 to 5), or NNR (herein, R is alkyl having the number of carbon of 1 to 5), x is 2 or 3, and y is 0, 1, 2, or 3.

When the wire is formed of the Mo alloy, it is preferable that the Mo alloy is MoW alloy including W less than 20 atomic percents.

Since the wire of such MoW alloy has a low resistivity less than the 15 μΩcm, it may be used as the wire of single film, and, however, they have characteristics of materials for pad, thereby being used as a wire by being deposited together with a conductive film of the Al or Al alloy. Especially, the wire of MoW alloy may be used for wire such as gate wire or data wire in an LCD.

Figure 1:
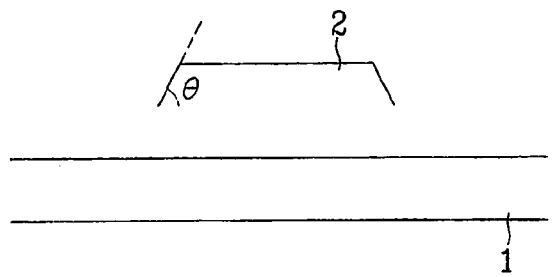
FIG. 1 is a cross sectional view showing an etched profile when MoW alloy film is etched using etchant for wire according to an embodiment of the present invention.

FIG. 1 shows a profile when MoW alloy film is etched using the etchant for wire according to the present invention. As shown in FIG. 1, it can be seen that a smoothing profile is formed.

That is, the MoW alloy film 2 including W of atomic percent of 10% is deposited on the substrate to have thickness of about 2,000 Å. Then, the film 2 is etched by using the etchant including the $HNO_3$ of 5%, $H_3PO_4$ of 63%, $CH_3COOH$ of 10%, the stabilizer of 3%, and the other ultra pure water. As a result, it was measured that the profile having a low slope angle θ of 30° to 40° has been formed, the etching ratio has been about 33 Å/sec, and the evenness has been about 1 to 2% with stability.

Then, the etchant for wire and the manufacturing method of the wire using the same according to the present invention are equally applicable to the manufacturing method of thin film transistor array panel for an LCD as described below referring to the drawings.

First, a structure of a thin film transistor panel for an LCD according to a first embodiment of the present invention will be described in detail referring to FIGS. 2 and 3.

Figure 2:
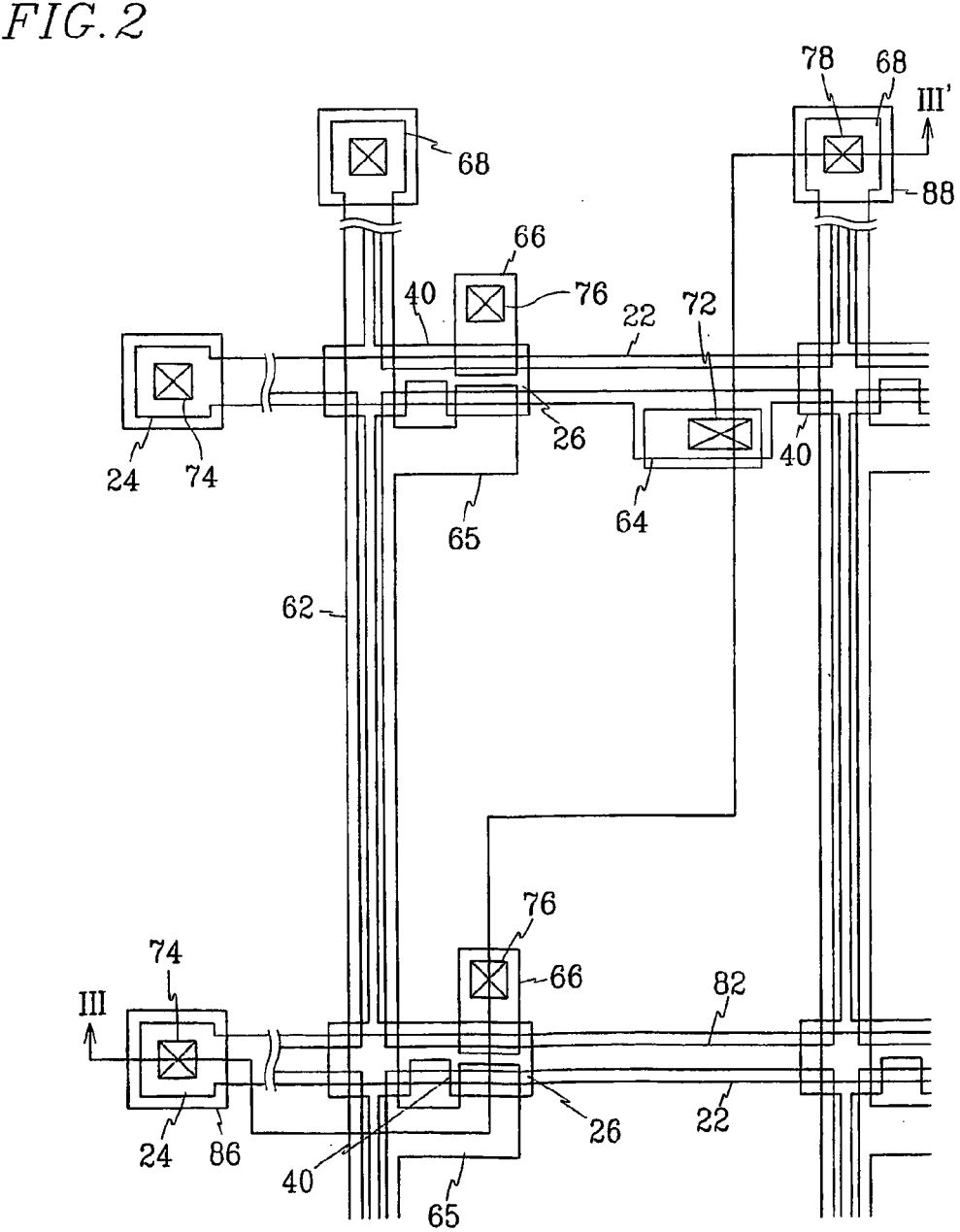
FIG. 2 is a thin film transistor substrate for a liquid crystal display according to an embodiment of the present invention.

FIG. 2 is a thin film transistor panel for an LCD according to the first embodiment of the present invention, and FIG. 3 shows a cross sectional view taken along line II–II' shown in FIG. 2.

The gate wire, which include a lower film 201 made of Al or Al alloy with a low resistance and an upper film 202 made of Mo or Mo alloy, is formed on an insulating substrate 10. The gate wire includes the gate lines 22, the gate pad 24, and gate electrodes 26. The gate lines 22 is extending in a transverse direction, the gate pad 24 is connected to one end of the gate lines 22 to receive gate signals from an external device and to supply the gate signals to the gate line 22, and gate electrodes 26 of the thin film transistor is connected to the gate lines 22.

The gate insulating layer 30 made of $SiN_x$, etc., covers the gate wire 22, 24, and 26 on the substrate 10.

A semiconductor layer 40 made of semiconductor such as amorphous silicon, etc., is formed with island-shaped on the gate insulating layer of the gate electrode 24, and, ohmic contact layers 55 and 56 made of material such as silicide or $n^+$ hydrogenated amorphous silicon doped with high-concentrated n type impurity, are formed on the semiconductor layer 40.

A data wire 62, 65, 66 and 68 made of Mo or MoW alloy are formed on the ohmic contact layers 55 and 56 and the gate insulating layer 30. The data wire includes a data line 62, a source electrode 65, a data pad 68 and a drain electrode 66. The data line extends in a longitudinal direction, intersecting the gate lines 22 to define the pixels, and the source electrodes 65 are branches of the data lines and extend to upper side of the ohmic contact layer 55. Also, the data pad 68 are connected to one end of the data lines 62 and receiving image signals from an external device and drain electrodes 66 are separated from the source electrodes and on the ohmic contact layer 56 disposed opposite to source electrodes 65 in relation to the gate electrodes 26. In the meanwhile, the data wire may include a conductor pattern for storage capacitor which overlaps the gate lines 22 and has a purpose of securing a storage capacity.

When the data wire 62, 64, 65, 66 and 68 is formed with double-layer, it is preferable that the one layer is added by a conductive film made of Al or Al alloy with a low resistance, and that a conductive film made of Mo or Mo alloy is formed on or under the conductive film made of Al or Al alloy.

On the data wire 62, 64, 65, 66 and 68 and the semiconductor layer 40 not blocked by this, the passivation layer 70 made of SiNx are formed.

On the passivation layer 70, the contact holes 72, 76 and 78 for exposing the conductor pattern for storage capacitor 64, the drain electrodes 66 and the data pad 68, are formed respectively, and also, the contact hole 74 for exposing the gate pad 24 together with the gate insulating layer 30 is formed.

In addition, on the passivation layer 70, pixel electrode 82 electrically connected to the conductor pattern for storage capacitor 64 and the drain electrodes 66 via the contact hole 72 and 76 and located in the pixels are formed.

An auxiliary gate pad 84 and an auxiliary data pad 88 each connected to the gate pad 24 and the data pad 68 via the contact holes 74 and 78 are also formed thereon. The pixel electrode 82, the auxiliary gate pad 86 and the data pad 88 are made of IZO (indium zinc oxide).

The thin film transistor array panel according to the first embodiment of the present invention has a contact structure of the upper film 202 of the gate pad 24, Mo or Mo alloy film of the drain electrode 66 and the data pad 68, and the IZO film. The gate wire 22, 24, and 26 and the data wire 62, 64, 65, 66, and 68 have the taper structure with a low slope angle, and tie panel has the evenness of 1 to 2% as a whole.

As shown in FIGS. 1 and 2, the pixel electrode 82 overlap the gate line to form storage capacitor, and when the storage capacitors are lack, wire for storage capacitances may be added on the same layer as the gate wire 22, 24 and 26. Furthermore, IZO pattern 82, 86 and 88 may be formed under the passivation layer 70 or the data wire 62, 64, 65, 66 and 68.

In the structure according to the embodiment of the present invention, the gate wire 22, 24 and 26 includes the Al or Al alloy having a low resistance, and, the gate wire 22, 24 and 26 and the data wire 62, 64, 65, 66 and 68 include Mo or Mo alloy having good contact feature with respect to another materials and having a low resistance. Therefore, the present invention may be applicable to the LCD of large display with a high definition and minimize the contact resistance in the pad, and thereby the reliance on the contact portion can be secured.

The manufacturing method of a thin film transistor array panel for an LCD will be described in detail referring to FIGS. 2, 3 and 4a to 7b.

Figure 4A:
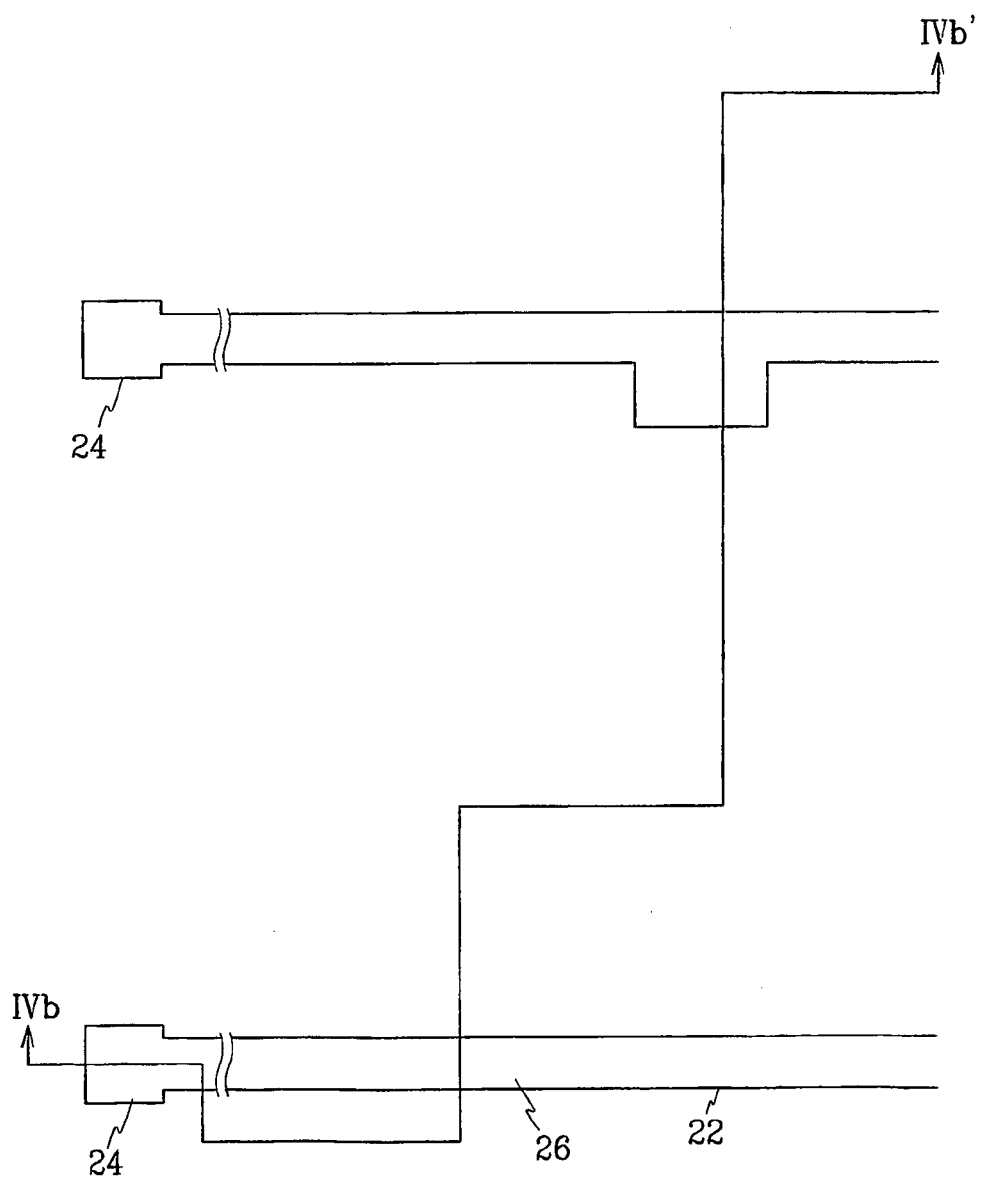
FIGS. 4a, 5a, 6a and 7a are layouts of the thin film transistor panel showing the middle process by the process order during processes for manufacturing the thin film transistor panel for the liquid crystal display according to a first embodiment of the present invention.
Figure 4B:
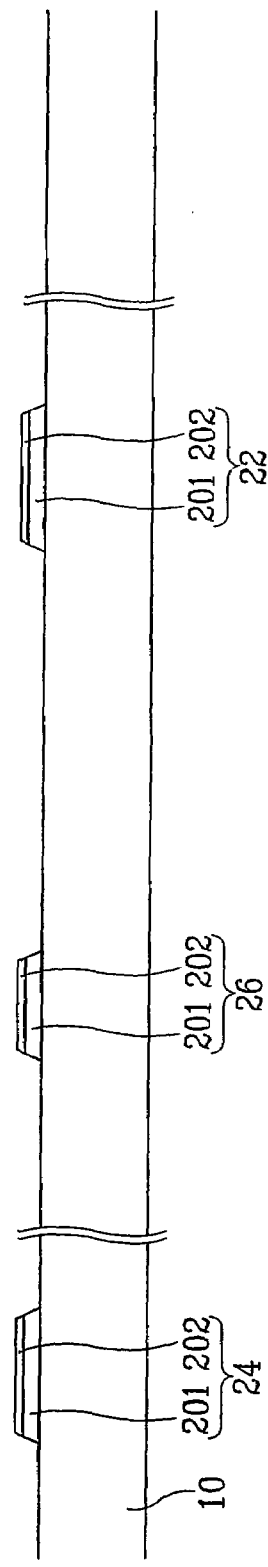

First, as shown in FIGS. 4a and 4b, the lower film 201 made of AlNd alloy including a neodymium of 2 atm %, which is one of Al alloy, is deposited about 2,500 Å thick on the substrate 10. Then, an upper film 20 made of MoW alloy including W of 10 atm % is deposited 500 Å thick on the lower film 201 and is patterned to form the gate wire including the gate lines 22, the gate electrodes 26 and gate pad 24. In this case, the etchant is an etchant for wire of Mo or Mo alloy including $HNO_3$ of 0.1–10%, $H_3PO_4$ of 65–55%, $CH_3COOH$ of 5–20%, a stabilizer of 0.1–5% and the other ultra pure water. By using the etchant, the double films 201 and 202 may be patterned to have the taper structure of a low slope angle depending on a single etching condition.

Figure 5A:
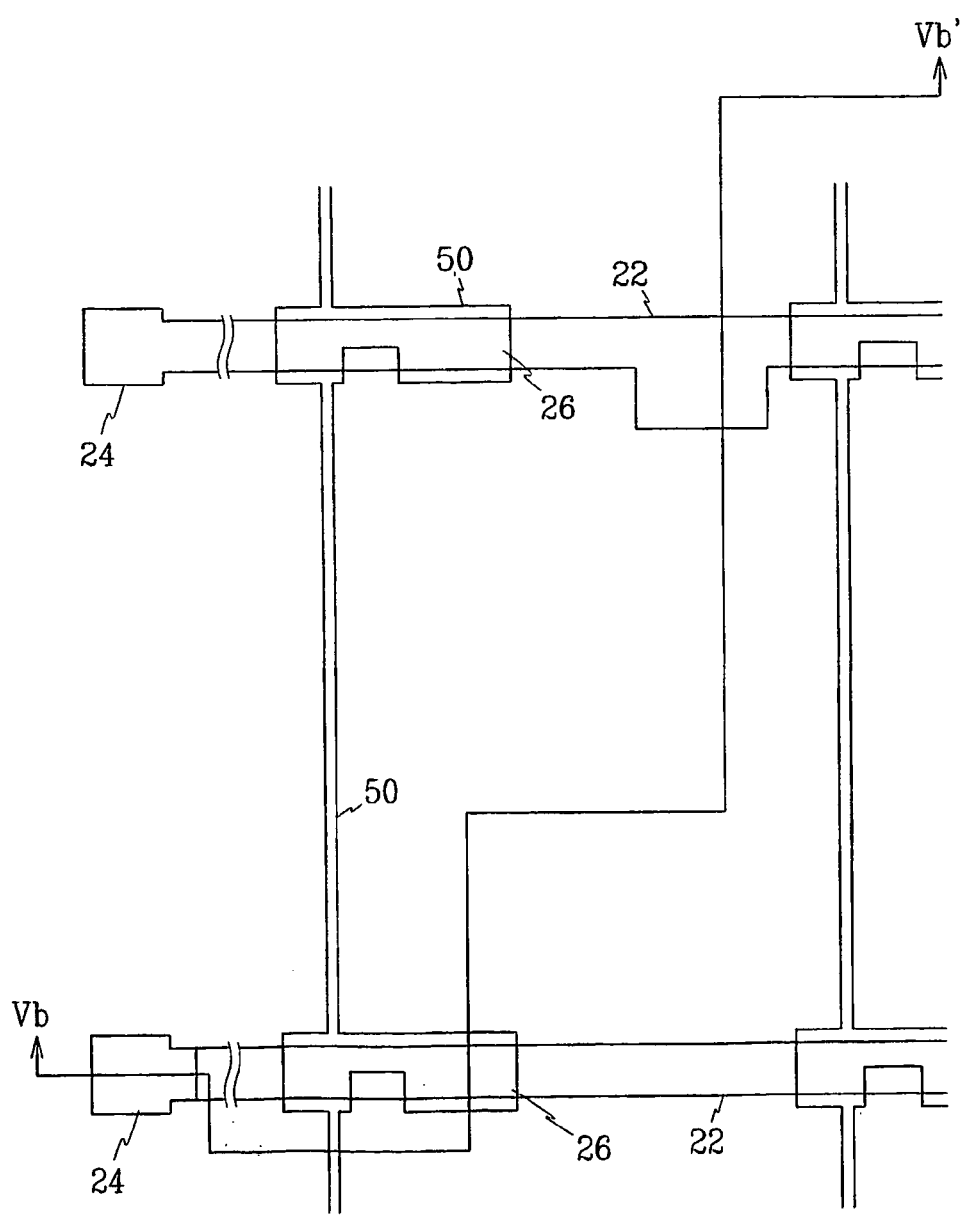
Figure 5B:
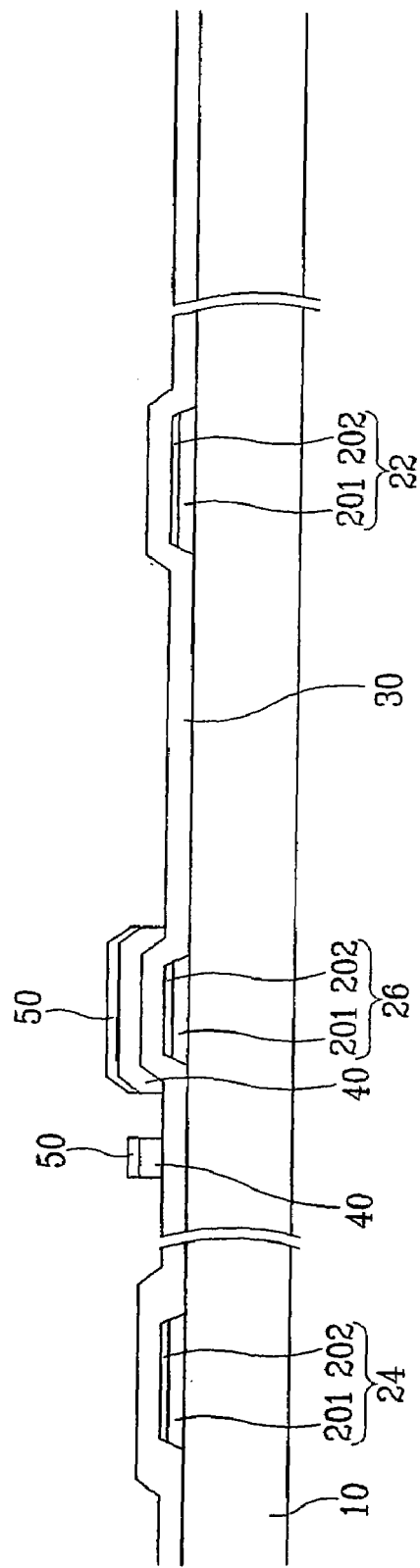
FIG. 5b is a cross sectional view taken along Vb–Vb' shown in FIG. 5a, and shows the next step of FIG. 4b.

Next, as shown in FIGS. 5a and 5b, three-layer film, i.e., a gate insulating layer 30 made of SiNx, a semiconductor layer 40 made of an amorphous silicon and a doped amorphous silicon layer 50, is deposited in succession, and the semiconductor layer 40 and the doped amorphous silicon layer 50 are patterned by patterning process using masks to form the semiconductor layer 40 and the ohmic contact layer 50 on the gate insulating layer 30 disposed opposite to the gate electrode 24.

Figure 6A:
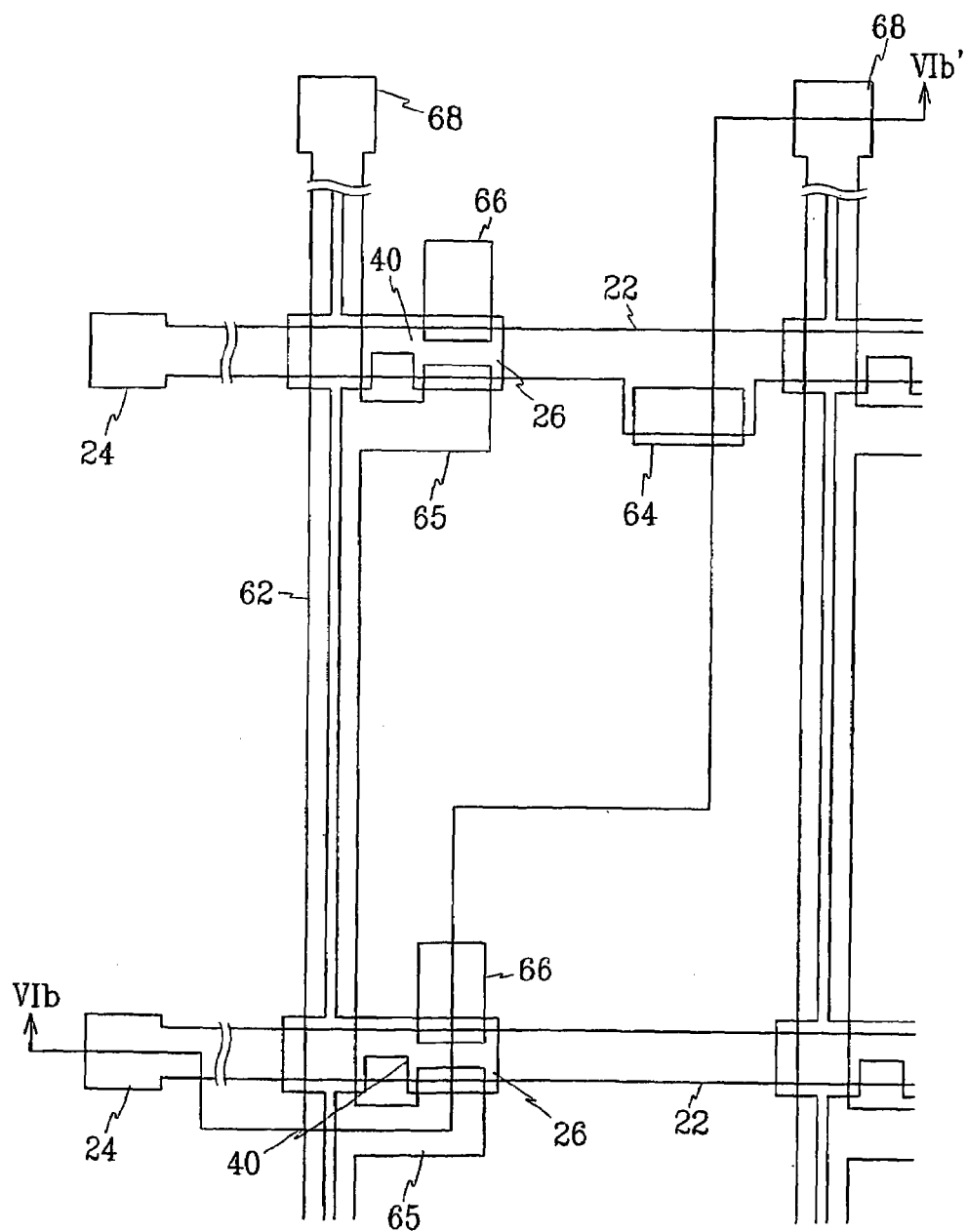

Then, as shown in FIGS. 6a and 6b, the MoW alloy containing W of 10% is deposited into MoW alloy film by sputtering a target, and then, is patterned by a photo etching process using masks to form data wire including a data line 62, a source electrode 65, a data pad 68, a drain electrode 66 and a conductor pattern for storage capacitor 64. The data line intersects the gate line 22, the source electrode 65 is connected to the data line and extends to an upper side of the gate electrode, the data pad 68 is connected to one end of the data line 62, the drain electrode 66 is separated from the source electrode 65 and disposed opposite thereto centering around the gate electrode 26 and the conductor pattern 64. In this case, the etchant for wire of Mo or Mo alloy including $HNO_3$ of 0.1–10%,. $H_3PO_4$ of 65–55%, $CH_3COOH$ of 5–20%, stabilizer of 0.1–5% and the other ultra pure water is also used. By using this etchant, the data wire 62, 64, 65, 66 and 68 of the taper structure having a low slope angle of 30–40° and its evenness of 1–2% can be obtained.

Next, the doped amorphous silicon layer pattern 50 not blocked by the data wire 62, 64, 65, 66 and 68 is etched to be divided into two parts centering around the gate electrode 26, and simultaneously the semiconductor layer 40 interposed between the doped amorphous silicon layers 55 and 56 is exposed.

Then, it is preferable to practice an oxygen plasma in order to stabilize a surface of the exposed semiconductor 40.

Figure 7A:
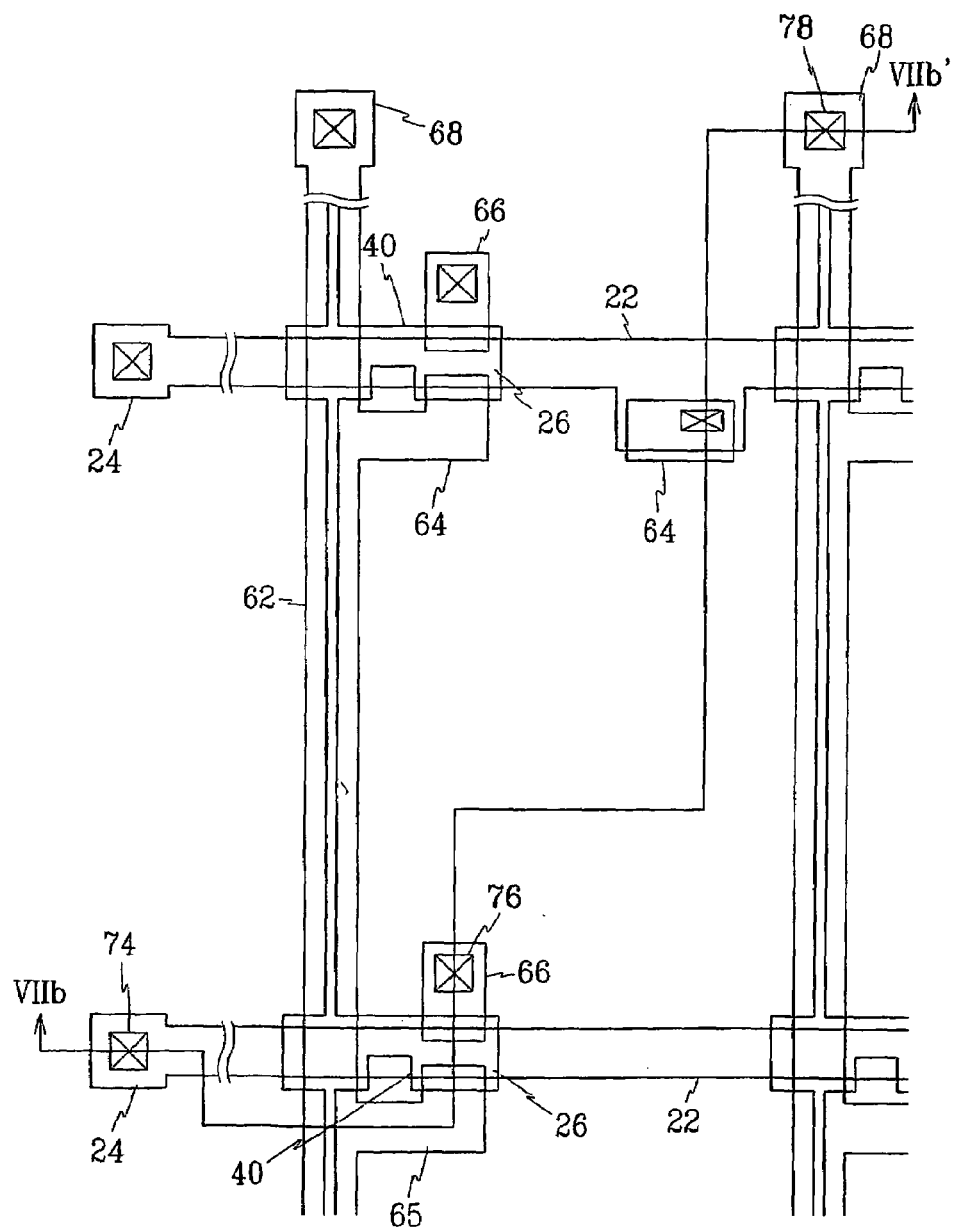
Figure 7B:
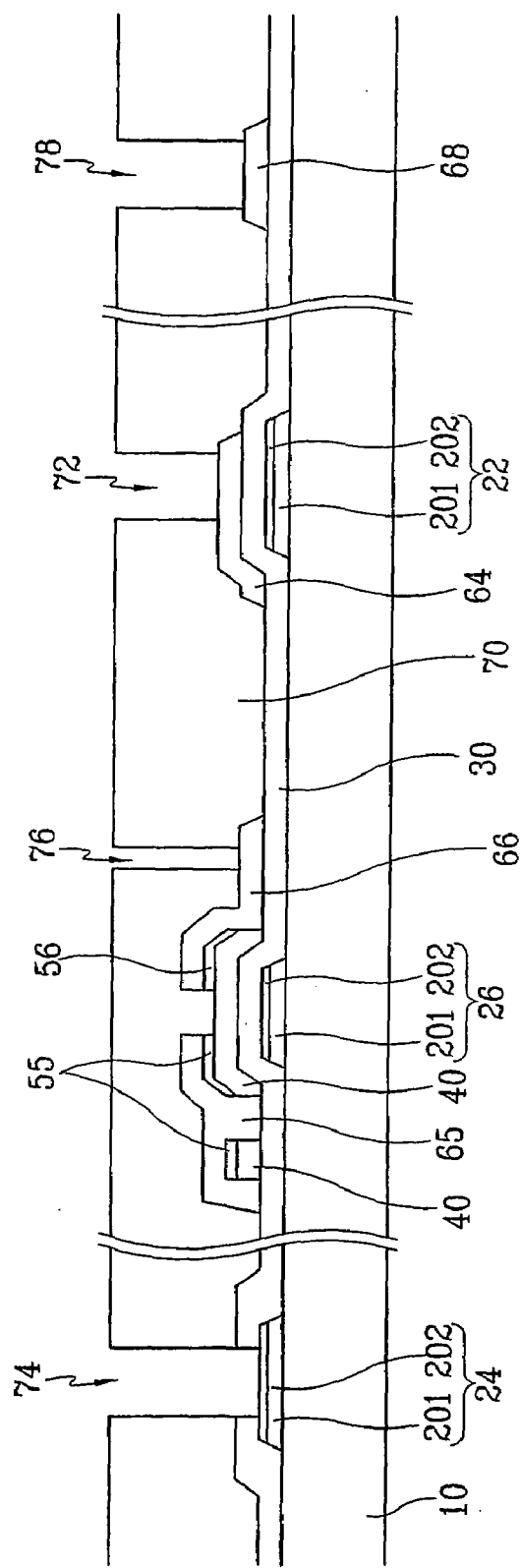
FIG. 7b is a cross sectional view taken along line VIIb-–VIIb' shown in FIG. 7a, and shows the next step of FIG. 6b.

Next, as shown in FIGS. 7a and 7b, the passivation layer 70 is formed by depositing an inorganic insulating film such as SiNx, or, SiOC or SiOF with a low dielectric, or coating an acryl-based organic insulating film, and thereafter, patterned by a photo etching process using masks together with the gate insulating layer 30 to form contact holes 72, 74, 76 and 78 for, exposing the conductor pattern for storage capacitor 64, the gate pad 24, the drain electrode 66 and the data pad 68, respectively.

Finally, as shown in FIGS. 2 and 3, the IZO film is deposited and patterned using masks to form the pixel electrode 82 connected to the conductor pattern for storage capacitor 64 and the drain electrode 66 via the contact holes 72 and 76, and the auxiliary gate pad 86 and the auxiliary data pad 88 each connected to the gate pad 24 and the data pad 68 via the contact holes 74 and 78.

In the manufacturing method according to the first embodiment of the present invention, after the contact holes for exposing MoW alloy film are formed to become two hundred with its size of 10×10 μm$^2$ and are connected in series, the contact resistances of their contact portions have been measured. As a result, they have been measured to be excellent as $10^3$–$10^4$ Ω.

In the manufacturing method according to the first embodiment of the present invention, by patterning a gate wire or a data wire of a single film or double films of Mo or Mo alloy using the etchant for wire of Mo or Mo alloy, it is possible to form a taper structure having a low resistance and a low contact resistance with another materials and also having a low slope angle, and a wire having an excellent evenness, and consequently, to increase a driving feature and a display feature of an LCD.

Although this method, as described previously, may be applicable to a method using five masks, it may be equally applicable to a manufacturing method of a thin film transistor panel of an LCD using four masks. This will be described in detail with reference to drawings.

First, a structure of unit pixel of a thin film transistor panel of an LCD manufactured using four masks according to an embodiment of the present invention with reference to FIGS. 8 to 10 will be described in detail.

Figure 8:
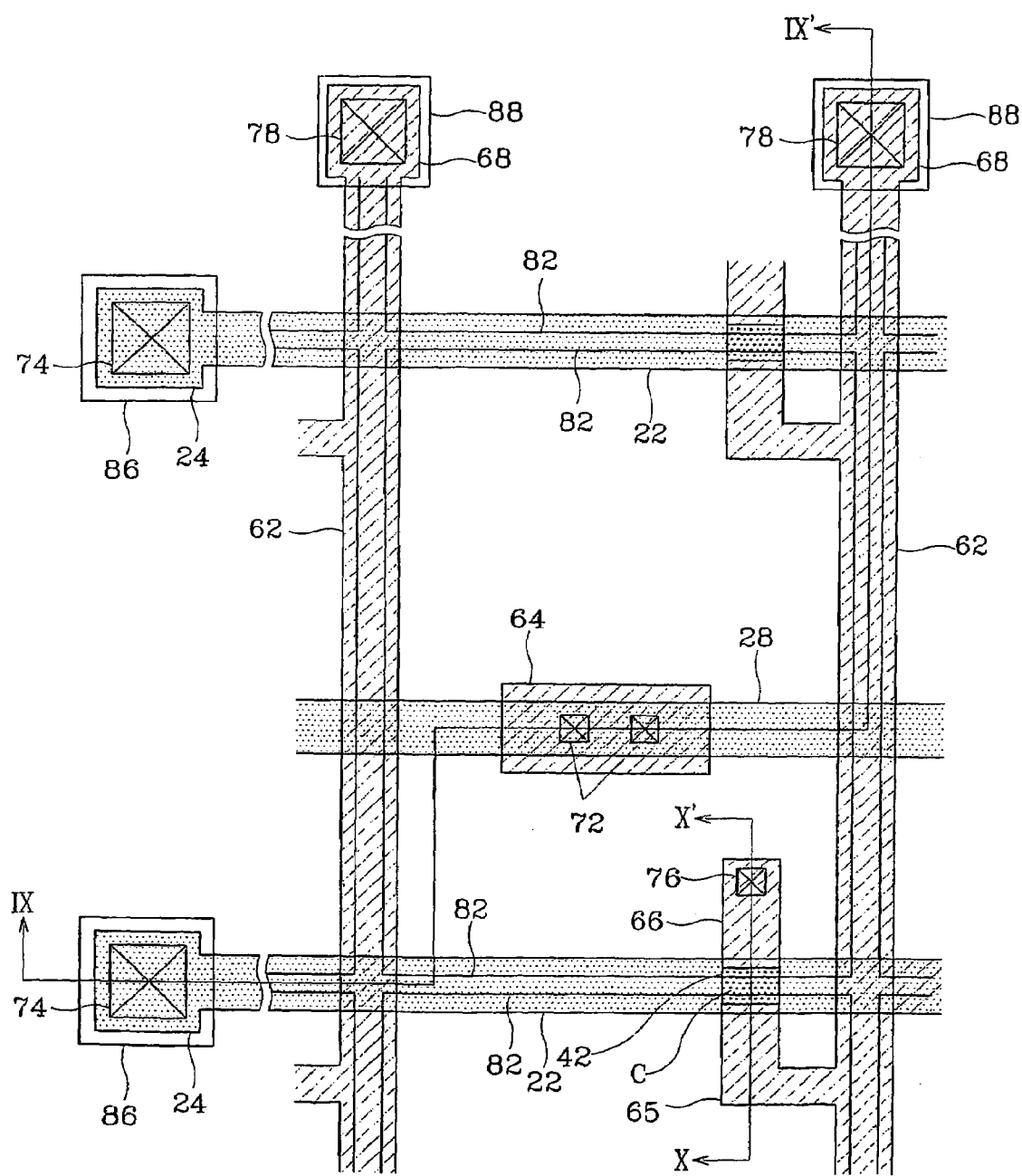
FIG. 8 is a layout of the thin film transistor panel for liquid crystal display according to a second embodiment of the present invention.
Figure 9:
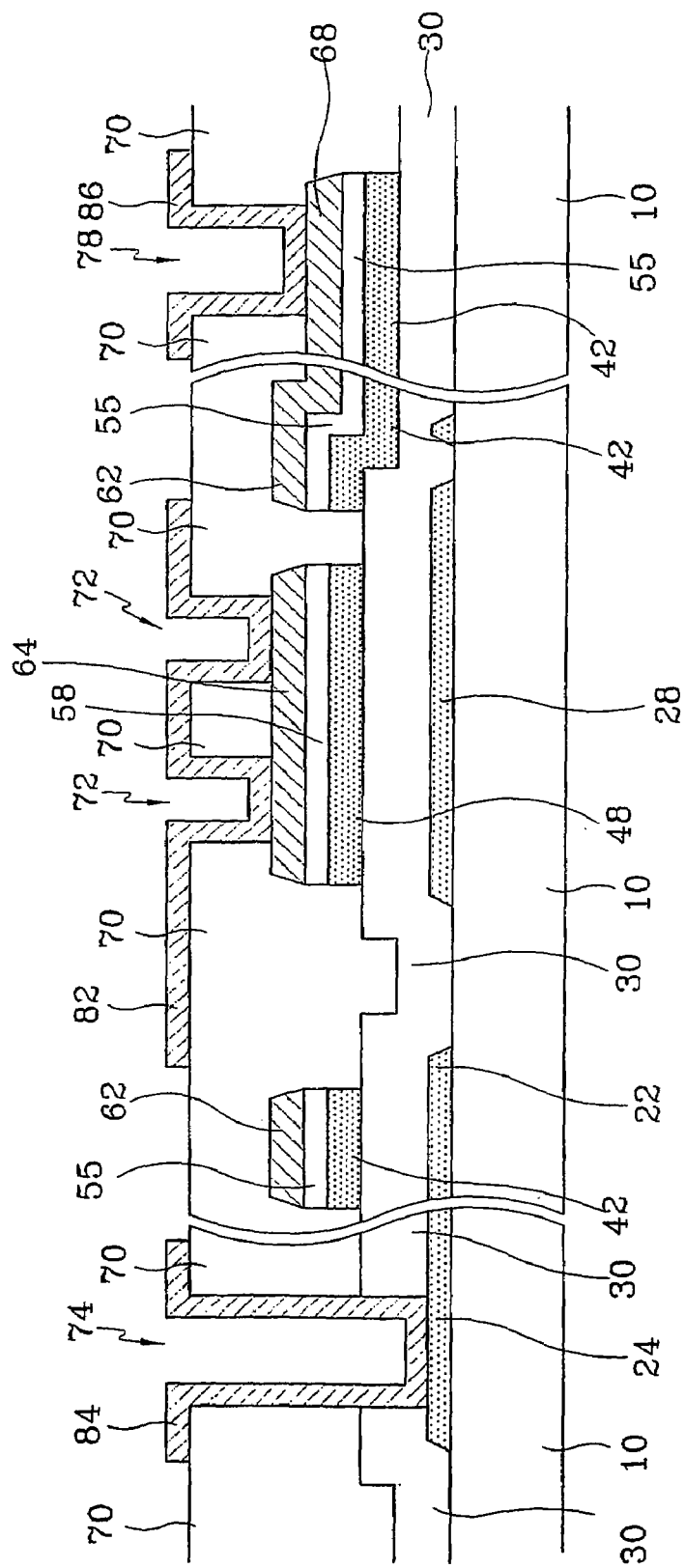
FIGS. 9 and 10 are cross sectional views taken along line VIII–VIII' and X–X' shown in FIG. 8, respectively.
Figure 10:
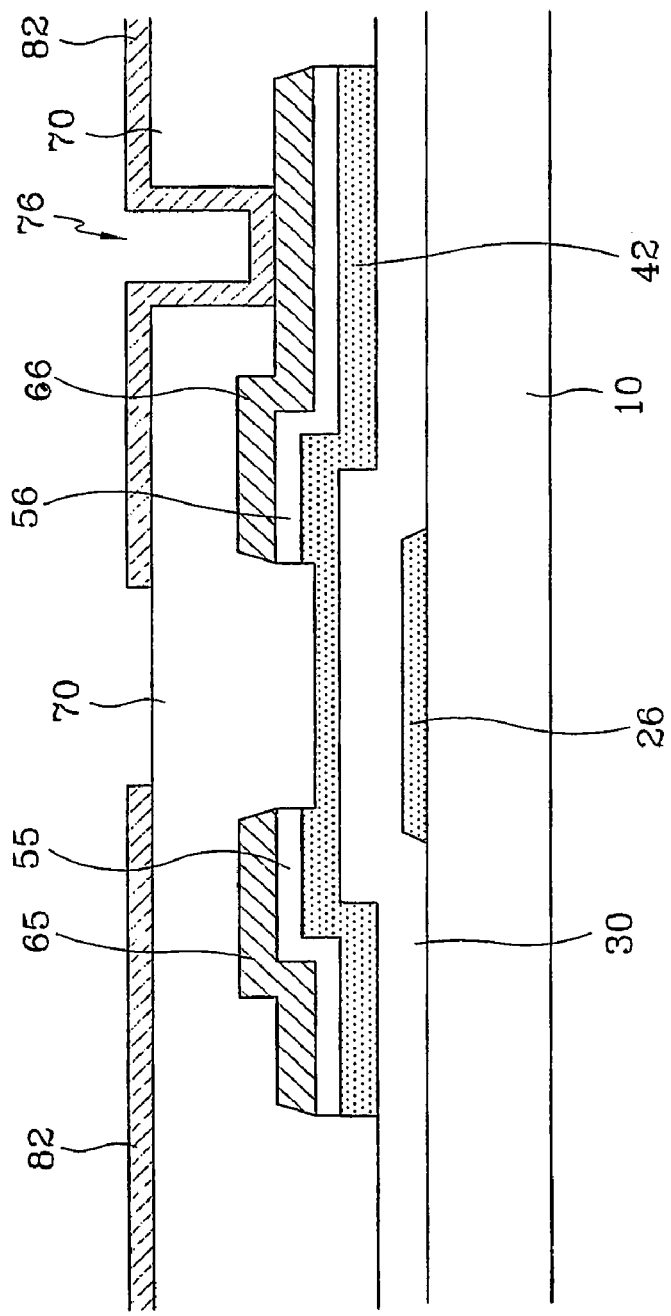

FIG. 8 is a layout of an thin film transistor panel of an LCD according to a second embodiment of the present invention, and FIGS. 9 and 10 are cross sectional views taken along lines IX–IX' and X–X' shown in FIG. 8, respectively.

First, like the first embodiment, a gate wire including a gate lines 22 comprising a conductive film of Al or Al alloy and a conductive film Mo or Mo alloy, a gate pad 24 and a gate electrodes 26, is formed on an insulating substrate 10. The gate wire also includes a storage capacitor, on the substrate 10, paralleled with the gate lines 22 and applied with voltages such as a common electrode voltage, etc., inputted to common electrode of an upper panel from an external device. The storage electrode 28 overlap a conductor pattern for storage capacitor 68 connected to pixel electrode described later to form storage capacitors for improving charge reservation ability of the pixel, and if storage capacitances generated by overlapping the pixel electrode 82 described later with the gate line 22 are enough, the storage capacitors may not be formed.

A gate insulating layer 30 made of SiNx, etc., and covering the gate wire 22, 24, 26 and 28 is formed.

Semiconductor pattern 42 and 48 made of a semiconductor such as a hydrogenated amorphous silicon is formed on the gate insulating layer 30, and ohmic contact layer pattern or middle layer pattern 55, 56 and 58 made of an amorphous silicon which n-type impurity such as P is doped high-concentrated are formed on the semiconductor patterns 42 and 48.

A data wire made of Mo or Mo alloy is formed on the ohmic contact layer patterns 55, 56 and 58. The data wire includes data portion comprising a data line 62, a data pad 68 connected to one end of the data line 62 to be applied with image signals from an external device, and a source electrodes 65 of thin film transistor which are branches of the data lines 62. The data wire also includes a drain electrodes 66 of thin film transistor separated from the data portion 62, 68 and 65, and placed opposite to the source electrode 65 in relation to the gate electrodes or channel portion C, and a conductor pattern for storage capacitor 64 placed over the storage electrodes 28. In case the storage electrode is not formed, neither is the conductor pattern formed.

The data wire is formed as double layers comprising a conductive film of Al or Al alloy similarly to the gate wire.

Contact layer patterns 55, 56 and 58 play a part in reducing contact resistances between the lower semiconductor patterns 42 and 48 thereof and the upper data wire 62, 64, 65, 66 and 68 thereof, which have perfectly the same forms as the data wire. That is, the middle layer pattern 55 in the data portion has the same shape as the data portion 62, 65 and 68, the middle layer pattern for the drain electrode 56 has the same shape as the drain electrode 66, and the middle layer pattern for the storage capacitor 58 has the same shape as the conductor pattern for the storage capacitor 68.

In the meantime, the semiconductor patterns 42 and 48 have the same shapes as the data wire 62, 64, 65, 66 and 68 and the ohmic contact layer patterns 55, 56 and 58 except the channel portion C of the thin film transistor.

In detail, the semiconductor pattern 48 for storage capacitor, the conductor pattern 68 for storage capacitor and the contact layer pattern 58 for storage capacitor have the same shapes, but the semiconductor pattern for thin film transistor 42 has a shape slightly different from the data wire and the contact layer patterns. In other words, the data portion 62, 68 and 65 in the channel portion of the thin film transistor, in particular, the source electrode 65 and the drain electrode 66 are separate, and the middle layer 55 of the data portion and the contact layer pattern for drain electrode 56 are also separate, however, the semiconductor pattern for thin film transistor 42 is not disconnected but connected in this place to form a channel of thin film transistor.

On the data wire 62, 64, 65, 66 and 68, the passivation layer made of SiNx, SiOC, SIOF or a photosensitive organic insulating material is formed.

The passivation layer 70 has contact holes 76, 78 and 72 for exposing the drain electrode 66, the data pad 68 and the conductor pattern for storage capacitor 64, and also has the contact hole 74 for exposing the gate insulating layer 30 and the gate pad 24.

A pixel electrode 82, which is applied with image signals from the thin film transistor to generate an electric field in cooperation with electrodes in the upper panel, are formed on the passivation layer 70. The pixel electrode 82 is made of a transparent conducting material, such as an IZO, etc., and is physically and electrically connected to the drain electrode 66 via the contact hole 76 to receive the image signals. The pixel electrode 82 also overlaps the adjacent gate line 22 and data line 62 to increase the aperture rate, however, alternately not overlap. In addition, the pixel electrode 82 is connected to the conductor pattern for storage capacitor 64 via the contact hole 72 to transmit the image signals thereto. On the gate pad 24 and the data pad 68, the auxiliary gate pad 84 and the auxiliary data pad 88 connected thereto via the contact holes 74 and 78 are formed. These play a part in complementing the adhesivity of the pad 24 and 68 and external circuit devices and protecting the pad. It is selective whether these are applied or not.

A method of manufacturing a thin film transistor for an LCD having structures of FIG. 8 to FIG. 10 using four masks will be described in detail with reference to FIG. 8 to FIG. 10 and FIG. 11a to FIG. 17c.

Figure 11A:
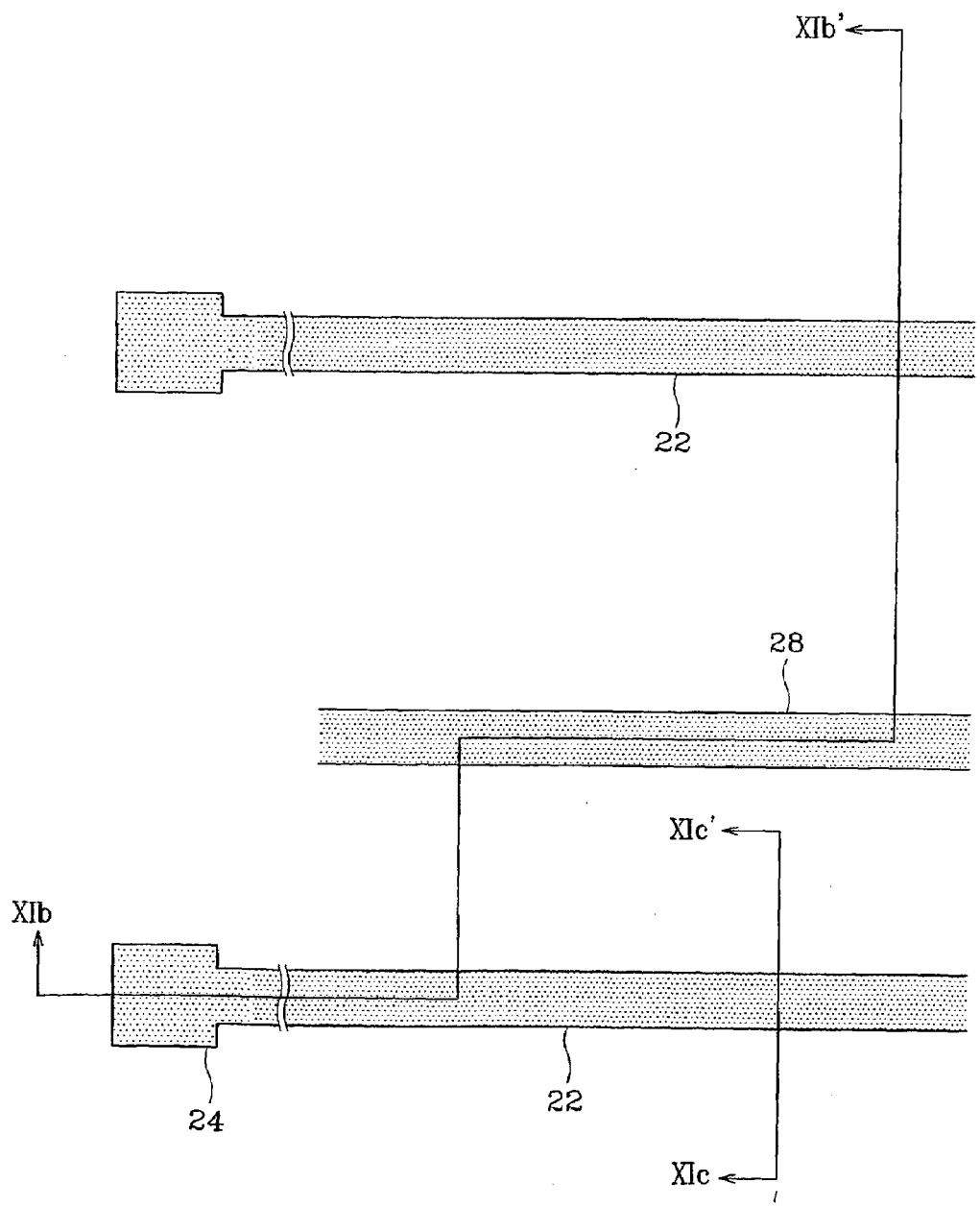
FIG. 11a is a layout of the thin film transistor panel in a first step, which is manufactured according to a second embodiment of the present invention.

First, as shown in FIGS. 11a to 11c, in the same manner as the first embodiment, a lower film including Al and an upper film including Mo or Mo alloy are deposited in succession, and then the gate wire including a gate line 22, a gate pad 24, a gate electrode 26 and a storage electrode 28 are formed on a substrate 10 by a photo etching process using mask.

Figure 12A:
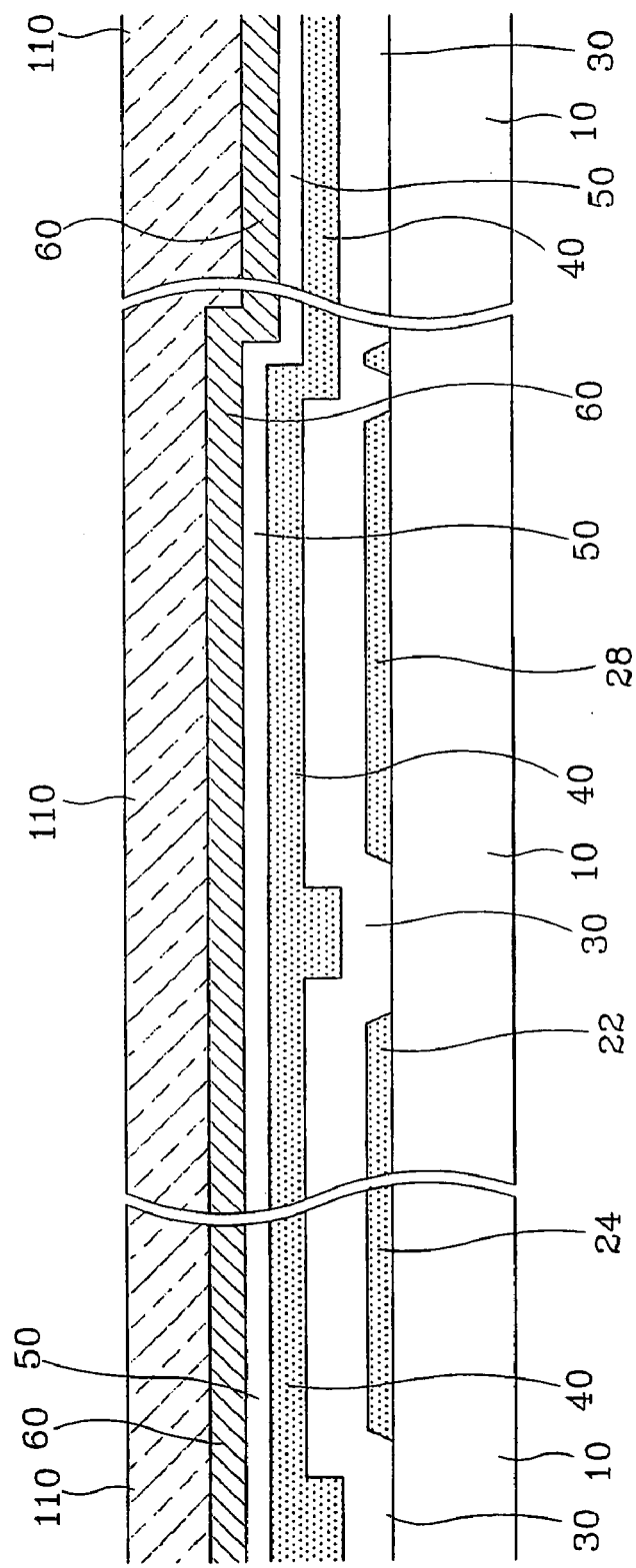

Next, as shown in FIGS. 12a and 12b, a gate insulating layer 30 made of SiNx, a semiconductor layer 40 and a middle layer 50 are deposited in succession 1,500–5,000 Å, 500–2,000 Å and 300–600 Å thick, respectively, by a chemical vapor deposition, and then, a conductor layer 60 including a conductive film made of MoW alloy containing Mo of 10% is deposited 1,500–73,000 Å thick by way of a sputtering, etc., and thereafter, a photosensitive film 110 is coated 1 μm–2 μm thick thereon.

Figure 13A:
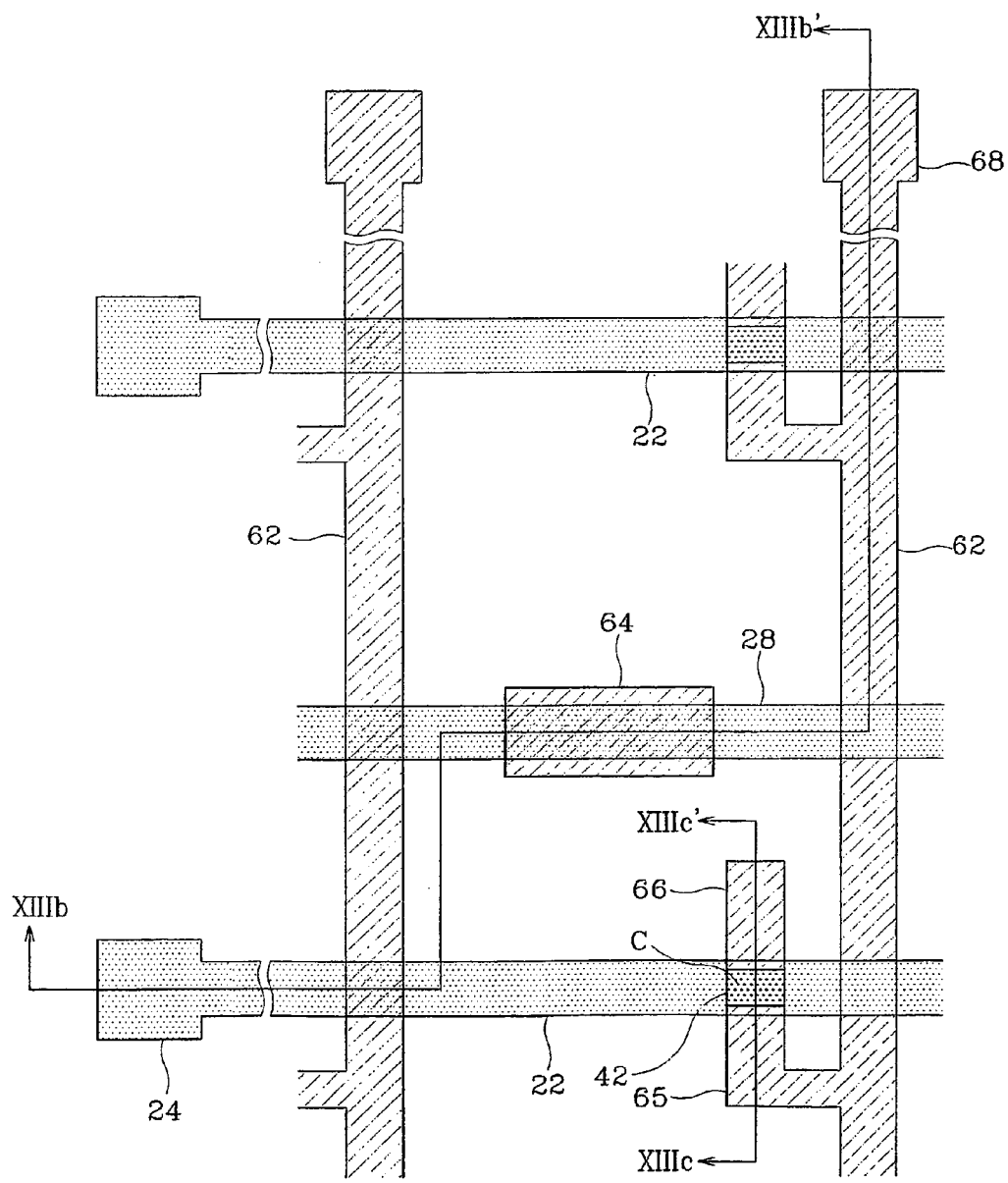
FIG. 13a is a layout of the thin film transistor in the next step of FIGS. 12a and 12b.
Figure 13C:
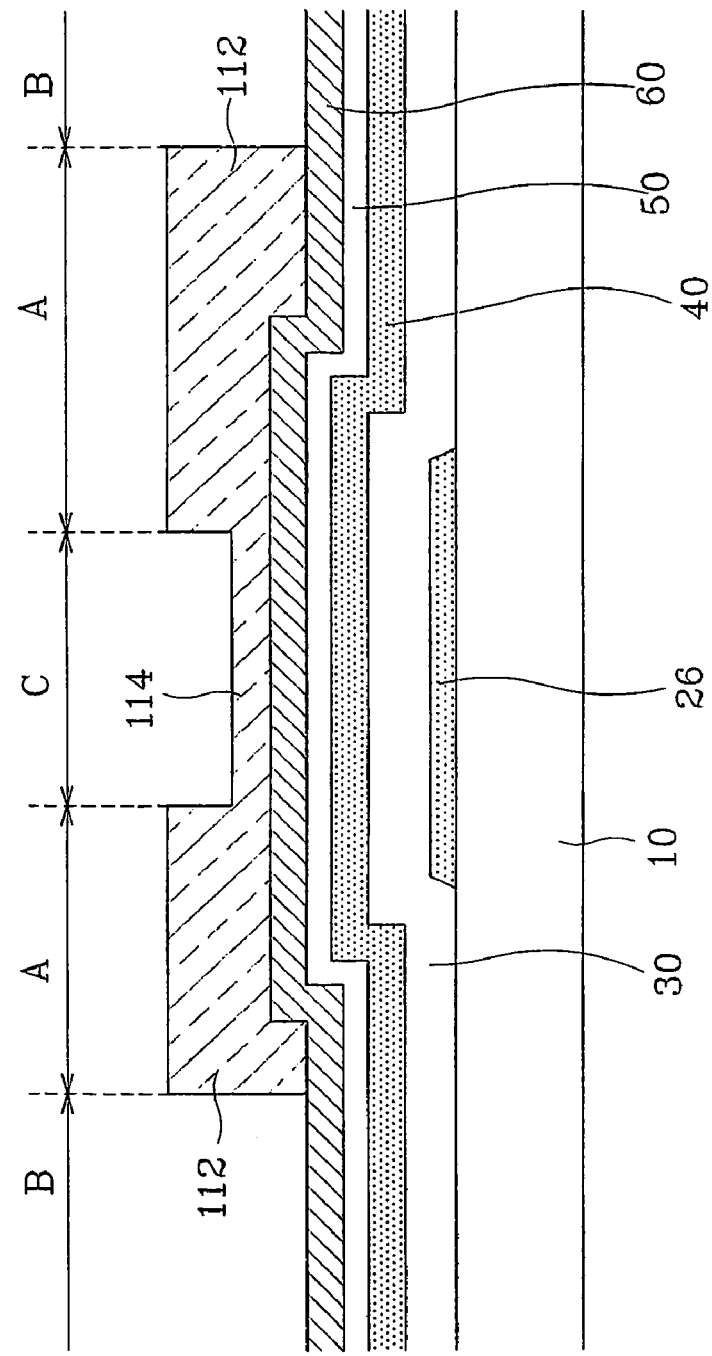

Next, after a light is irradiated to the photosensitive film 110 through mask and developed, the photosensitive patterns 112 and 114 are formed as shown in FIGS. 13b and 13c. The channel portion C of thin film transistor of the photosensitive film patterns 112 and 114, i.e., the first portion 114 interposed between the source electrode 65 and the drain electrode 66 is made to be thinner than the data portion A, i.e., the second portion 112 located in the portion where the data wire 62, 64, 66 and 68 will be formed, and all the photosensitive films in the other portions B are removed. Here, the ratio of the thickness of the photosensitive film 114 left in the channel portion C and the photosensitive film 112 left in the data wire portion A is made to be varied depending on a process condition of etching process described later, and it is preferable that the thickness of the first portion 114 is less than a half, for example, less than 4,000 Å of that of the second portion 112.

As above, there may be several methods for varying the thickness of the photosensitive film depending on positions, and the pattern of a slit type or a lattice type is formed on the mask, or, the semi-transmittance area is formed thereon by using a semi-transparent film, in order to adjust an amount of a light transmittance in an area A.

In this regard, it is preferable that a line width of the patterns or an interval of the pattern placed among the slits, that is, the width of the slit is smaller than a resolution used, at exposure in case of using a semi-transparent film, and thin films with different transmittances or different thickness may be used to adjust the transmittance on manufacturing masks.

When a light is irradiated to the photosensitive film through such masks, high molecules in the portion exposed directly to the light are completely decomposed, and high molecules in the portion where the slit pattern or the semi-transparent film is formed are not completely decomposed because an amount of a light irradiation is smaller, and high molecules in the portion blocked by a light-shield film is hardly decomposed. Next, when the photosensitive film is developed, the portion where the high molecules are not decomposed is left, and the portion where the light is irradiated a little is left thinner than that in the portion where the light is not irradiated at all. Here, since the molecules all are decomposed in case exposure time is made to be long, it is necessary not to do so.

A photosensitive film made of a material capable of reflowing is used and exposed with a mask whose portions transmitting a light completely and not transmitting a light completely is divided, and then, developed and reflowed to get part of the photosensitive film to flow to the portion where the photosensitive film does not remain, and consequently, such thinner photosensitive film 114 may be formed.

Next, the photosensitive film 114 and the lower films thereof, i.e., the conductor layer 60, the middle layer 50 and the semiconductor layer 40 are etched. In this case, the data wire and the lower films thereof have to be left the same in the data wire portion A, only the semiconductor layer has to be left in the channel portion C, and the above three layers 60, 50 and 40 all have to be removed to expose the gate insulating layer 30 in the other portions B.

Figure 14A:
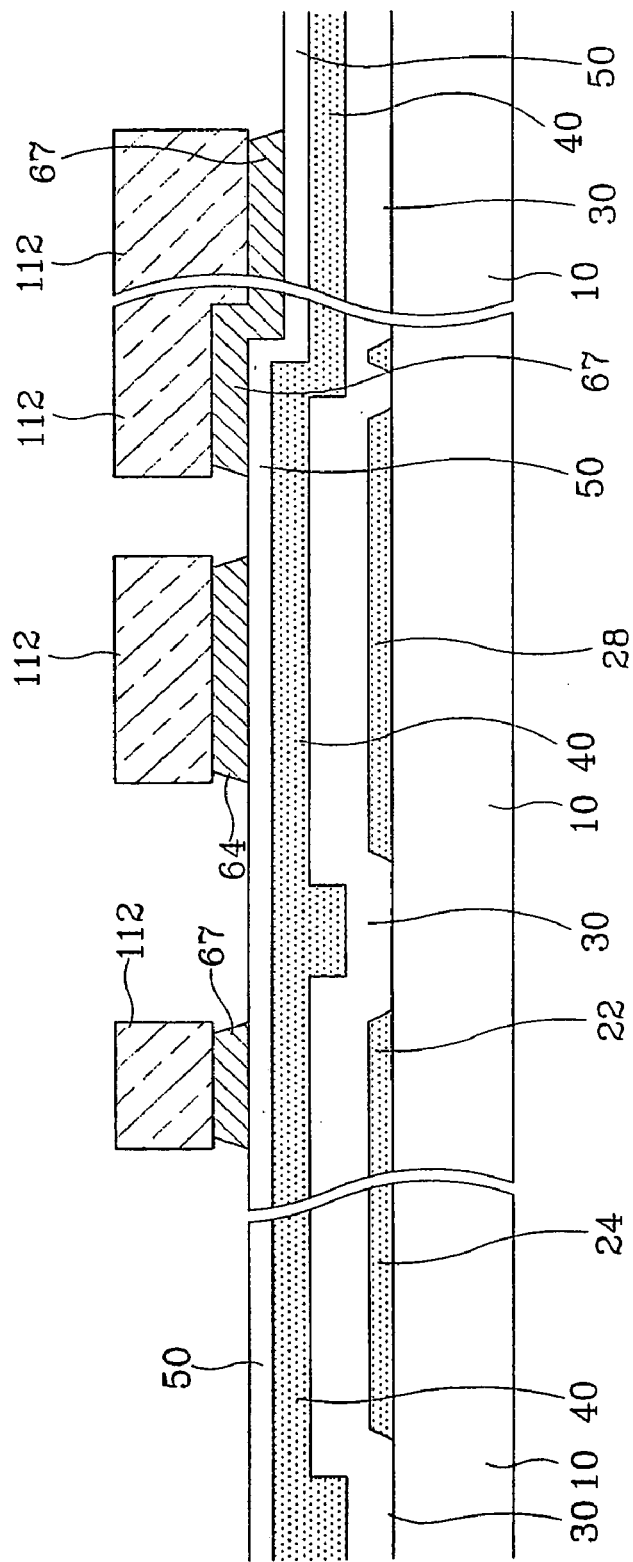
FIGS. 14a, 15a and 16a and FIGS. 14b, 15b and 16b are cross sectional views taken along line XIIIb–XIIIb' shown in FIG. 13a, respectively, and show the next step of FIG. 13b and FIG. 13c by a process order.
Figure 14B:
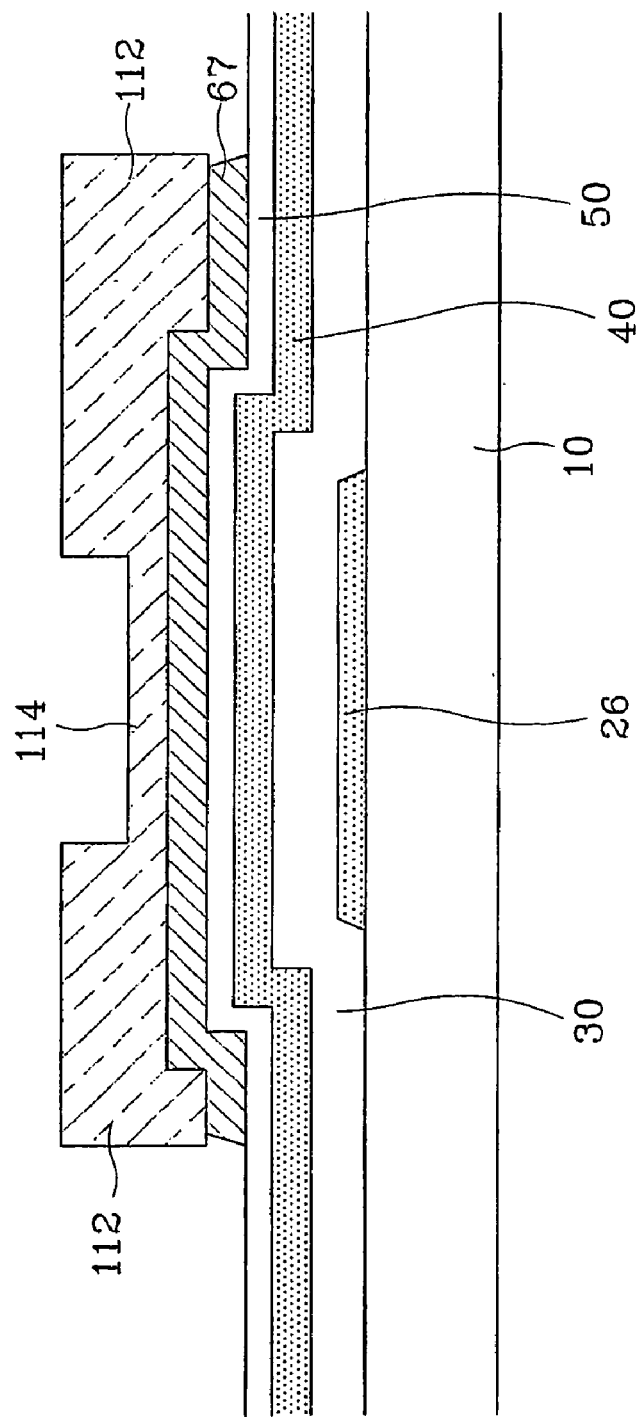

First, as shown in FIGS. 14a and 14b, the conductor layer 60 exposed in the other portions B is removed to expose the middle layer 50 thereof. Both a dry etching and a wet etching are used in this process, and here, they are preferably performed under the condition that the conductor layer 60 is etched and the photosensitive film patterns 112 and 114 are hardly etched. However, it is not easy that the condition, which only the conductor layer 60 is etched and the photosensitive film patterns 112 and 114 is not etched, is found in the dry etching, and therefore it may be performed under the condition that the photosensitive patterns 112 and 114 are etched, too. In this case, the first portion 114 is made to be thicker than in tire wet etching, and thereby it has to be prevented that the first portion 114 is so removed that the lower conductor layer 60 is exposed.

Here, in case that the conductor layer 60 is made of one of Mo or MoW alloy, Al or Al alloy, or Ta, anything of the dry etching and the wet etching is possible. However, in case the conductor layer 60 is made of Cr, since Cr is not removed well, only the wet etching had better be used, and $CeNHO_3$ is used as an etchant. When the conductor layer 60 is made of Mo or MoW and the dry etching is used, as an etching gas, a mixed gas such as $CF_4$ and HCl or $CF_4$ and $O_2$ is used; and, the etching ratio of the latter has almost the same as that of the photosensitive film.

In the second embodiment of the present invention, when the conductor layer 60 is made of Mo or Mo alloy and patterned by an wet etching, the etchant for wire of Mo or Mo alloy including $HNO_3$ of 0.1–10%, $H_3PO_4$ of 65–55%, $CH_3COOH$ of 5–20%, stabilizer of 0.1–5% and the other ultra pure water is also used in the same manner as the first embodiment. By using this etchant, it is possible that the conductor pattern for source/drain 67 and the conductor pattern 68 are patterned to be a taper structure having a low slope angle.

In this way, as shown in FIG. 14a and FIG. 14b, the conductor layer 60 in the channel portion C and the data wire B, that is, only the conductor pattern for source/drain 67 and the conductor pattern 64 are left and the conductor pattern 60 in the other portions B are removed to expose the middle layer 50 thereof. Here, the remaining conductor patterns 67 and 64 are the same forms as the data wire 62, 64, 65, 66 and 68 except the point that the source electrode 65 and the drain electrode 66 are not disconnected but connected. Furthermore, when the dry etching is used, the photosensitive patterns 112 and 114 are etched to some extent of thickness.

Figure 15A:
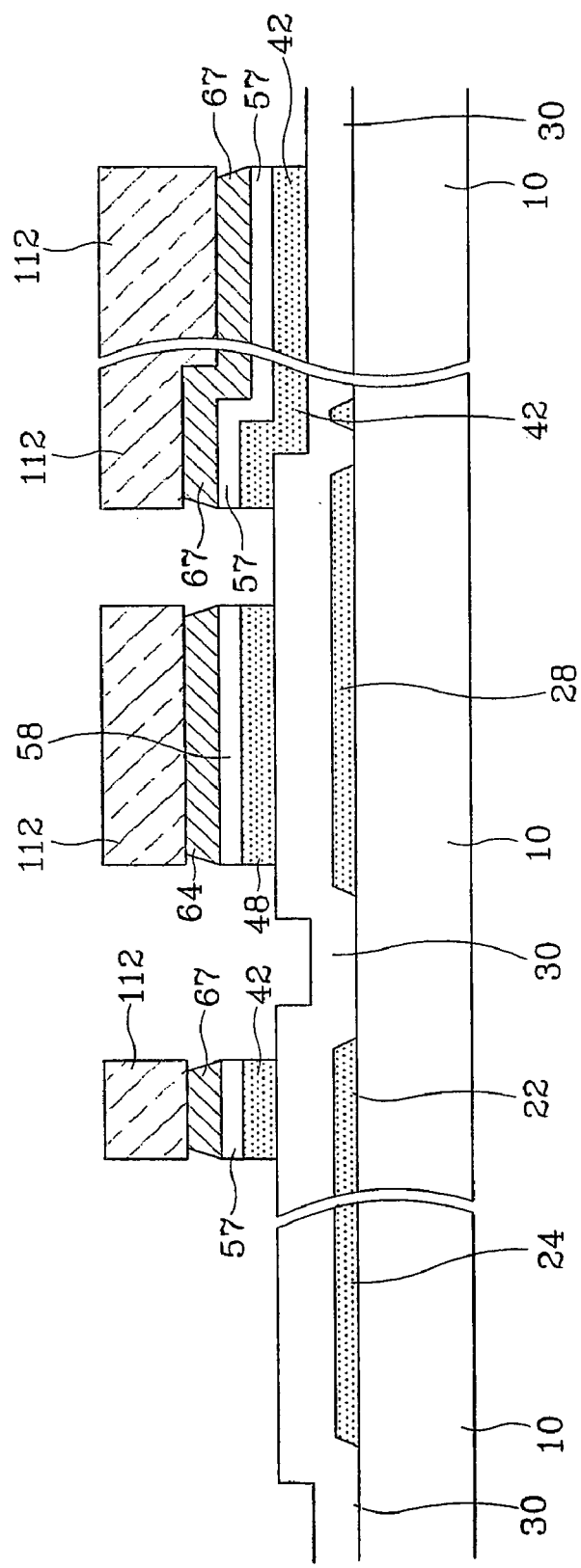
Figure 15B:
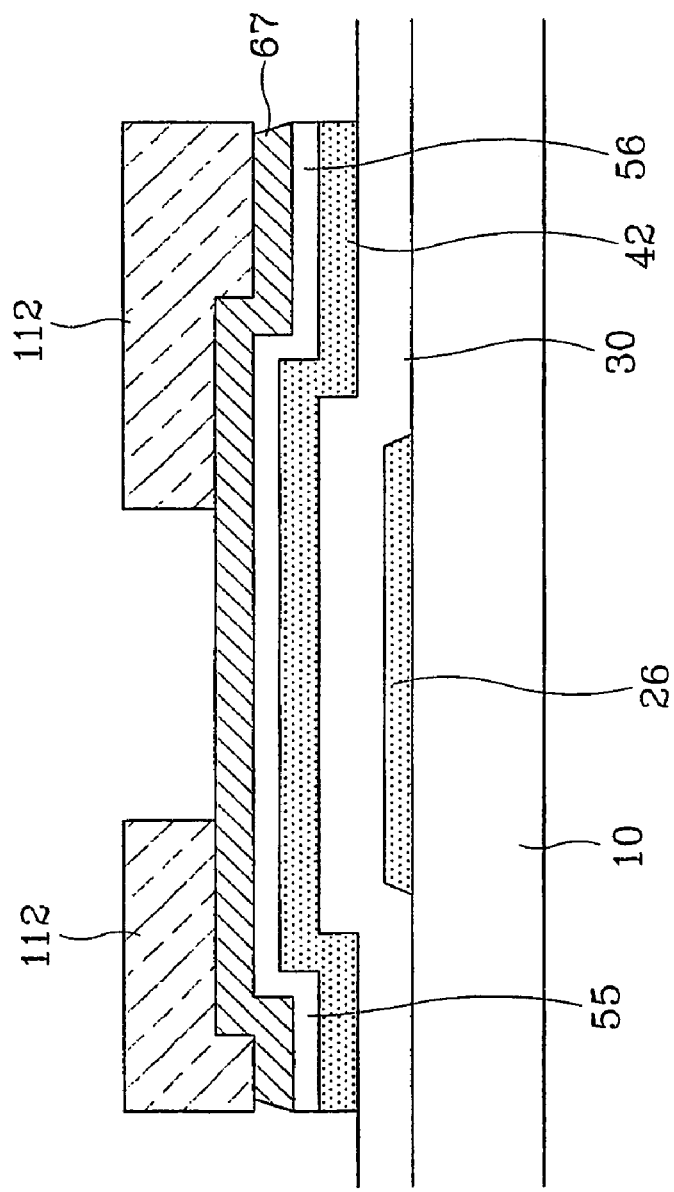

Next, as shown in FIG. 15a and FIG. 15b, the exposed middle layer 50 and the lower semiconductor layer 40 thereof in the other portions B are simultaneously removed together with the first portion by a dry etching. The etching of the middle layer 50 and the semiconductor layer 40 should be performed under the condition that the photosensitive film patterns 112 and 114, the middle layer 50 and the semiconductor layer 40 (the middle layer and the semiconductor layer hardly have etching selectivity) are simultaneously etched and the gate insulating layer 30 is not etched, especially it is preferable that the etching ratio of the photosensitive film patterns 112 and 114 and the semiconductor pattern 40 is almost the same condition. For example, when using a mixed gas of $SF_6$ and HCl or $SF_6$ and $O_2$ is used, the two layers may be etched by almost the same thickness. When the etching ratio of the photosensitive film patterns 112 and 114 and the semiconductor pattern 40 is the same, the thickness of the first portion 114 is the same as, or less than the sum of that of the semiconductor layer 40 and the middle layer 50.

In this way, as shown in FIGS. 15a and 15b, the first portion 114 in the channel portion C is removed to expose the conductor pattern 67, and the middle layer 50 and the semiconductor layers 40 in the other portions B are removed to expose the lower gate insulating layer 30 thereof. In the meanwhile, the second portion 112 in the data wire A is also etched, and hence it becomes thinner. Moreover, the conductor patterns 42 and 48 are completed in this procedure. The reference numerals 57 and 58 refer to the lower middle layer pattern of the conductor pattern 67 and the lower middle layer pattern of the conductor pattern 64, respectively.

Then, photosensitive film remnants left in the surface of the conductor pattern 67 in the channel portion C are removed through an ashing process.

Figure 16A:
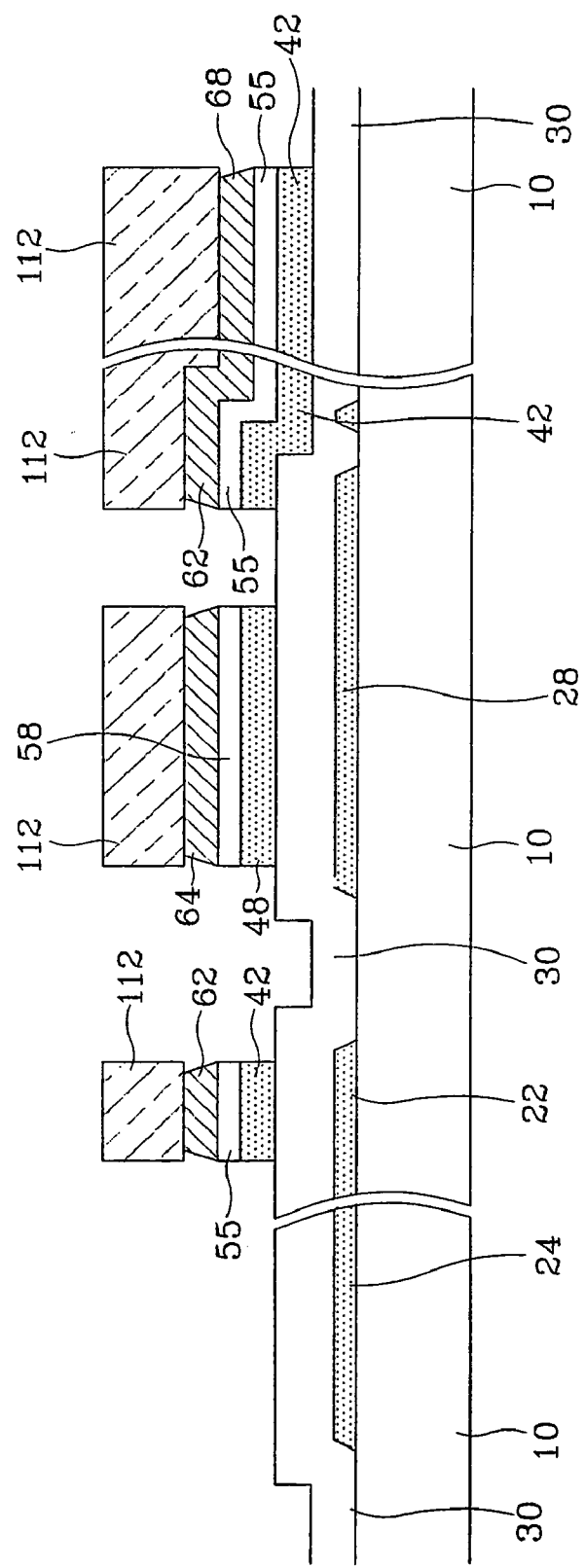
Figure 16B:
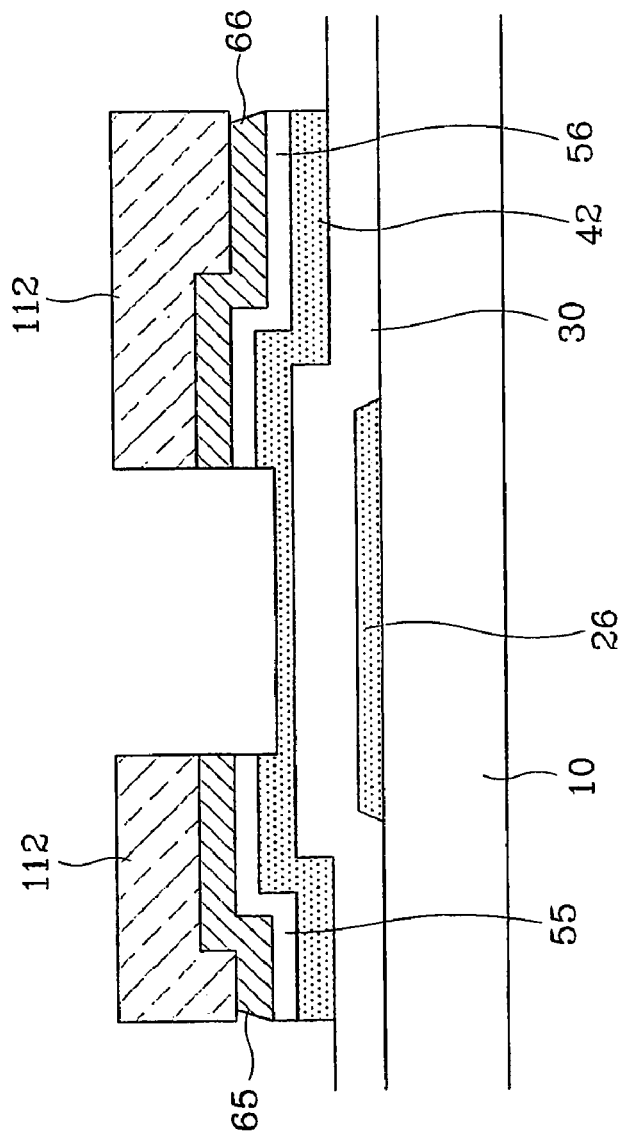

Next, as shown in FIGS. 16a and 16b, the conductor pattern 67 and the lower middle pattern 57 thereof in the channel portion C are etched to be removed. Here, the etching of both of them may be done using only a dry etching, the conductor pattern 67 may be etched by a wet etching, and the middle layer pattern 57 may be etched by a dry etching. In case of the former, it is preferable that the conductor pattern 67 and the middle layer pattern 57 is etched under the condition that its etching selection ratio is large, this is because, if not large, it is not easy to find the end point of etching, and thereby, it is not easy to adjust the thickness of the semiconductor pattern 42 left in the channel potion C. As an example, a mixed gas of $SF_6$ and $O_2$ is used to etch the conductor pattern 67. In case of the latter to perform the dry etching and the wet etching one after the other, while the side of the conductor pattern 67 by the wet etching is etched, the middle layer pattern 57 by the dry etching is etched, thereby forming the step-shaped. As an example of an etching gas used to etch the middle layer pattern 57 and the semiconductor pattern 42, there is a mixed gas of aforementioned $CF_4$ and HCl or a mixed gas of $CF_4$ and O2. If using the mixed gas of $CF_4$ and $O_2$, the semiconductor pattern 42 with an even thickness can be left. In this regard, as shown in FIG. 16b, part of the semiconductor pattern 42 is removed and thus its thickness becomes smaller, and here, the second portion 112 of the photosensitive film pattern is also etched to some extent of thickness. This etching has to be performed under the condition that the gate insulating layer 30 is not etched, and it is preferable that the photosensitive film pattern is thick so that the second portion 12 is etched not to expose the lower data wire 62, 64, 65, 66 and 68 thereof.

In this way, the source electrode 65 and the drain electrode 66 are isolated, and simultaneously the data wire 62, 64, 65, 66 and 68 and the contact layer patterns 55, 56 and 58 thereof are completed.

Finally, the second portion 112 of the photosensitive film left in the data wire portion A is removed. However, the second portion 112 may be removed after the conductor pattern 67 in the channel portion C is removed and before the lower middle layer pattern 57 thereof is removed.

As described above, a wet etching and a dry etching may be used one after the other, or only a dry etching may be used. The latter is relatively simple in the process owing to using one kind of etching but an etching condition is not easy to find. In contrast, the former is complex relative to the latter but an etching condition is relatively easy to find.

Figure 17A:
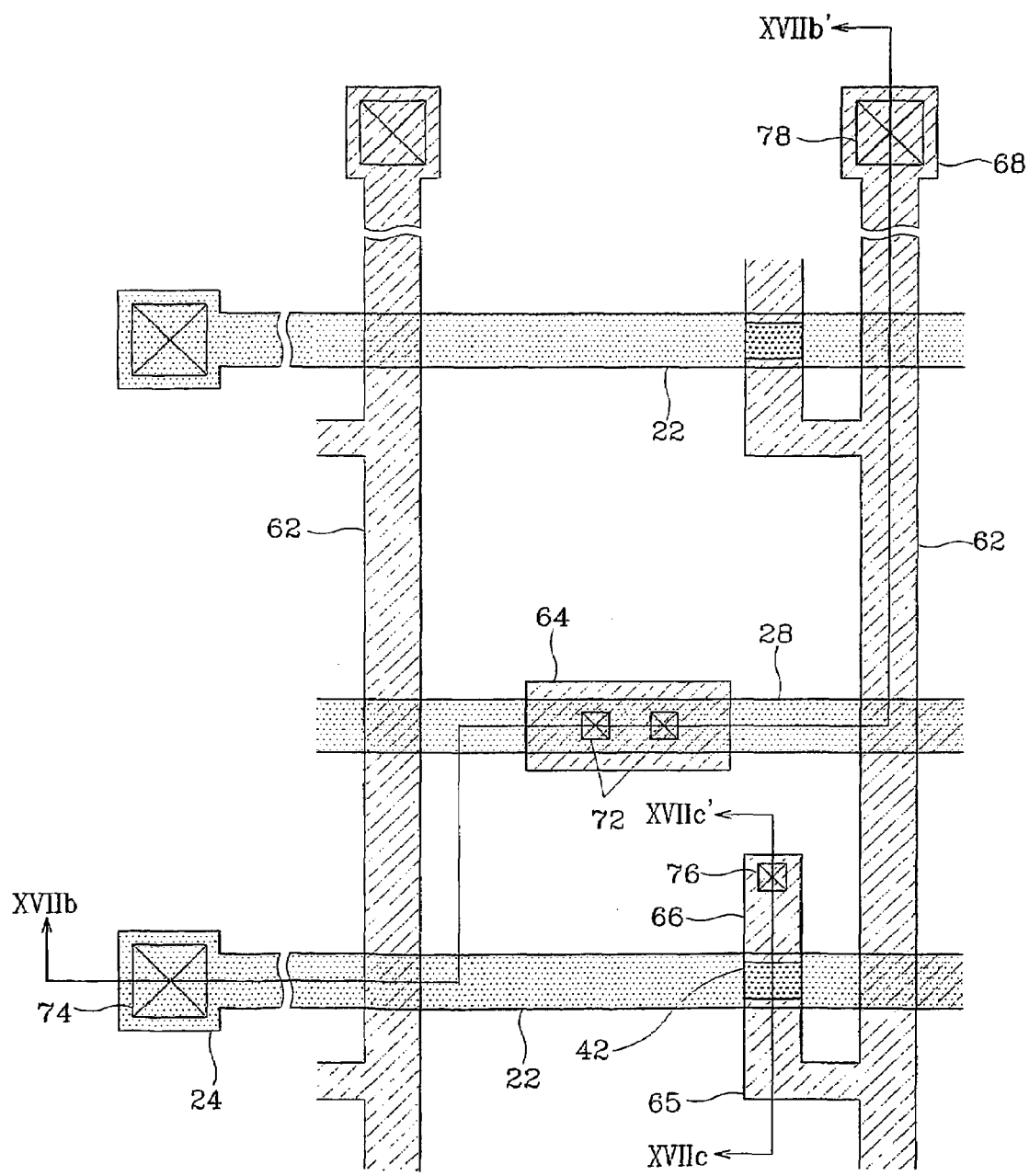
FIG. 17a is a layout of the thin film transistor panel in the next step of FIG. 16a and FIG. 16b.
Figure 17B:
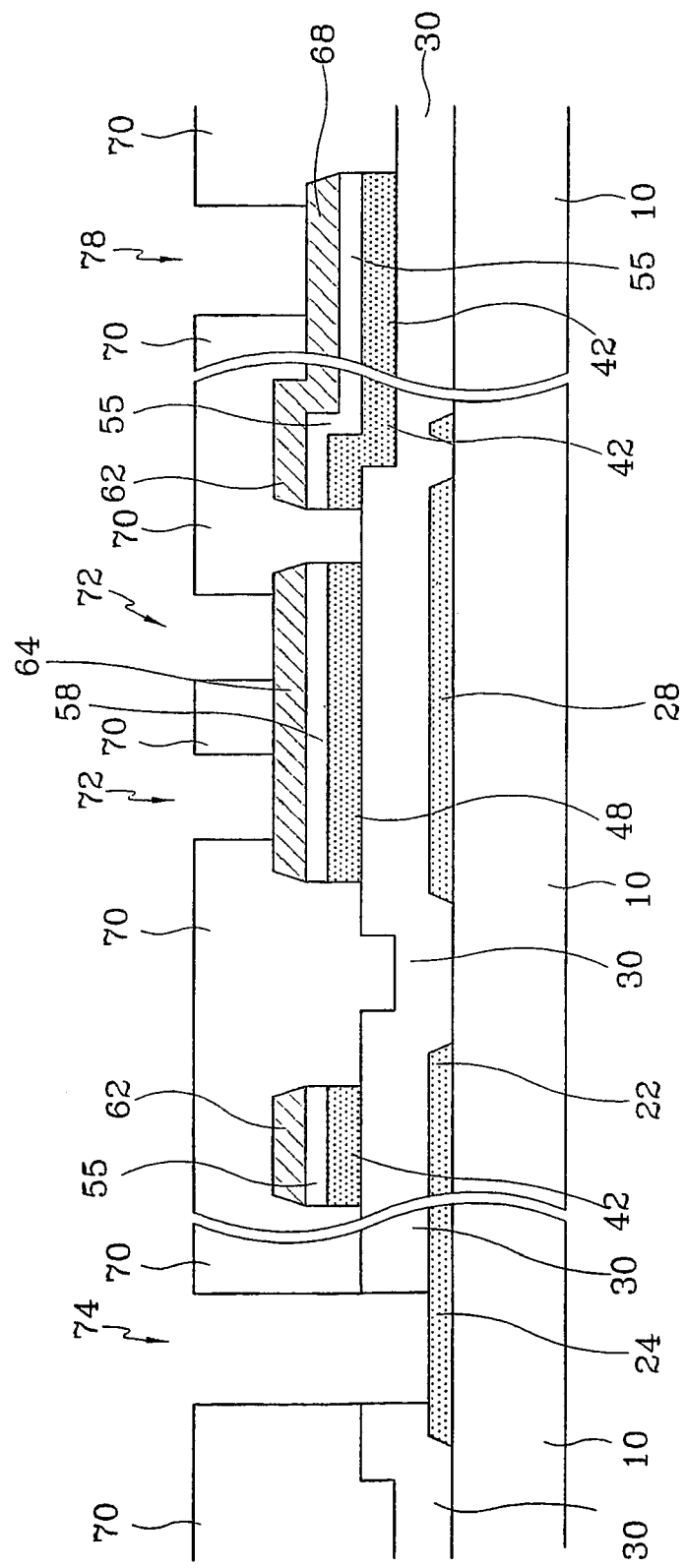

After the data wires 62, 64, 65, 66 and 68 are formed in such way, as shown in FIG. 17a to FIG. 17c, SiNx, SiOC or SiOF is deposited by a chemical vapor deposition or is coated with a photosensitive insulating film to form the passivation layer 70, and then, the passivation layer 70 is etched using masks to form the contact holes 76, 74, 78 and 72 for exposing the conductor pattern for storage capacitor 64, the gate pad 24, the drain electrode 66 and the data pad 68.

Finally, as shown in FIGS. 8 to 10, IZO having the thickness of 400 Å to 500 Å and etched using masks to form the pixel electrode 82 connected to the conductor pattern 64 and the drain electrode 66, an auxiliary gate pad 84 connected to the gate pad 24 and an auxiliary data pad 88 connected to the data pad 68.

The second embodiment of this present invention not only has the no effect according to the first embodiment but also can make the manufacturing process simplified by forming the data wire 62, 64, 65, 66 and 68, the lower contact layer patterns 55, 56 and 58 thereof and the semiconductor patterns 42 and 48 by using only one mask and by isolating the source electrode 65 and the drain electrode 66 in this process.

As above, in the manufacturing method of the present invention, an etchant for wire of Mo or Mo alloy is used to form a wire of a single layer or multi-layer of Mo or Mo alloy, thereby minimizing the retardation of signals and the contact resistance of the contact portion, and simultaneously forming the taper structure having a low slope angle and a wire having an excellent evenness. Therefore, it is possible to improve a driving feature and a display feature of an LCD of a large display with a high definition. Furthermore, it is possible to reduce the production cost by simplifying the manufacturing process to manufacture a thin film transistor for an LCD.

What is claimed is:

1. An etchant for wire, comprising $HNO_3$ of 0.1 to 10% by weight, $H_3PO_4$ of 65 to 55% by weight, $CH_3COOH$ of 5 to 20% by weight, stabilizer of 0.1 to 5% by weight and the other ultra pure water, wherein the stabilizer is represented as a formula $M(OH)_x \cdot L_y$, wherein in the formula, the M is Si, or B, the L is $H_2O$, $NH_3$, CN, COR (herein, R is an alkyl having the number of carbon of 1 to 5), or NNR (herein, R is an alkyl having the number of carbon of 1 to 5), wherein x is 2 or 3, and y is 0, 1, 2, or 3.

2. The etchant for wire of claim 1, wherein the etchant is used to etch Mo or Mo alloy.

3. The etchant for wire of claim 2, wherein the etchant is used to etch Mo or MoW alloy.

4. The etchant for wire of claim 1, wherein the M is Cr.

5. The etchant for wire of claim 1, wherein the M is Si.

6. The etchant for wire of claim 1, wherein the M is B.

7. The etchant for wire of claim 1, wherein the L is COR (herein, R is an alkyl having the number of carbon of 1 to 5).

8. The etchant for wire of claim 1, wherein the L is NNR (herein, R is an alkyl having the number of carbon of 1 to 5).

* * * * *